United States Patent
Glazier et al.

(10) Patent No.: US 10,540,671 B2
(45) Date of Patent: Jan. 21, 2020

(54) MESSAGING GATEWAY MONETIZATION SYSTEM

(71) Applicant: Wildfire Systems, Inc., Solana Beach, CA (US)

(72) Inventors: Jordan Glazier, Rancho Santa Fe, CA (US); Ian Miller, Solana Beach, CA (US); Lloyd Daniel Markham, Jr., San Diego, CA (US)

(73) Assignee: WILDFIRE SYSTEMS, INC., Solana Beach, CA (US)

( * ) Notice: Subject to any disclaimer, the term of this patent is extended or adjusted under 35 U.S.C. 154(b) by 0 days.

(21) Appl. No.: 16/520,209

(22) Filed: Jul. 23, 2019

(65) Prior Publication Data

US 2019/0347685 A1 Nov. 14, 2019

Related U.S. Application Data

(63) Continuation-in-part of application No. 15/826,585, filed on Nov. 29, 2017, now Pat. No. 10,402,845.
(Continued)

(51) Int. Cl.
*G06Q 30/02* (2012.01)
*H04L 29/08* (2006.01)
*G06Q 50/00* (2012.01)

(52) U.S. Cl.
CPC ..... *G06Q 30/0214* (2013.01); *G06Q 30/0239* (2013.01); *G06Q 50/01* (2013.01); *H04L 67/22* (2013.01); *H04L 67/02* (2013.01)

(58) Field of Classification Search
None
See application file for complete search history.

(56) References Cited

U.S. PATENT DOCUMENTS

| | | |
|---|---|---|
| 7,664,726 B2 | 2/2010 | Jain et al. |
| 8,027,883 B2 | 9/2011 | Donaldson |

(Continued)

FOREIGN PATENT DOCUMENTS

WO 2016046824 A1 3/2016

OTHER PUBLICATIONS

"Self-expression shouldn't be limited to text", webpage retrieved on Apr. 17, 2017, from http://tapslash.com/features, 8 pages.
(Continued)

*Primary Examiner* — Sam Refai
*Assistant Examiner* — Rashida R Shorter
(74) *Attorney, Agent, or Firm* — Arc IP Law, PC; Joseph J. Mayo

(57) ABSTRACT

A system that automatically detects references to items like products or brands within messages and replaces those references with referral links to web pages associated with those items. Links may be inserted into a message, such as a text message or email, at a messaging gateway without any action on the part of the sender (or receiver) of a message. Senders or receivers may opt out of or into the link insertion service. The system provides privacy and security because personal information identifying the sender or receiver is not passed to the link insertion service. When the recipient of a message clicks an inserted link and performs a transaction, a referral credit is given to the communication intermediary, and also potentially to the message sender or recipient. The system may analyze modifiers in the message to construct a link to a specific product or service at a website.

20 Claims, 28 Drawing Sheets

Related U.S. Application Data which is a continuation of application No. 15/706,637, filed on Sep. 15, 2017, now Pat. No. 10,169,770, which is a continuation-in-part of application No. 15/483,791, filed on Apr. 10, 2017, now Pat. No. 10,229,427.

(56) References Cited

U.S. PATENT DOCUMENTS

| | | | |
|---|---|---|---|
| 8,103,547 | B2 | 1/2012 | Mah et al. |
| 8,521,818 | B2 | 8/2013 | McGann et al. |
| 8,849,931 | B2 | 9/2014 | Linner et al. |
| 9,348,813 | B2 | 5/2016 | Mankovich et al. |
| 1,016,493 | A1 | 12/2018 | Attolini et al. |
| 2005/0149851 | A1 | 7/2005 | Mittal |
| 2006/0129455 | A1 | 6/2006 | Shah |
| 2008/0154951 | A1* | 6/2008 | Martinez ............... G06Q 30/02 |
| 2011/0004525 | A2 | 1/2011 | Byrne |
| 2011/0145057 | A1 | 6/2011 | Jones et al. |
| 2012/0041838 | A1 | 2/2012 | Serbanescu |
| 2012/0084160 | A1 | 4/2012 | Badros et al. |
| 2012/0173367 | A1 | 7/2012 | Soroca et al. |
| 2012/0215871 | A1 | 8/2012 | Zhang |
| 2012/0316948 | A1 | 12/2012 | Shipley et al. |
| 2013/0066722 | A1 | 3/2013 | Alkatib |
| 2013/0173367 | A1 | 7/2013 | Beighley, Jr. |
| 2013/0204703 | A1 | 8/2013 | Carlson et al. |
| 2013/0246225 | A1 | 9/2013 | Blitz |
| 2013/0246323 | A1 | 9/2013 | Athas et al. |
| 2014/0067501 | A1 | 3/2014 | Rozenvasser |
| 2014/0172812 | A1 | 6/2014 | Chisalita |
| 2014/0282016 | A1 | 9/2014 | Hosier |
| 2014/0292016 | A1 | 10/2014 | Masuda |
| 2015/0007307 | A1 | 1/2015 | Grimes et al. |
| 2015/0019203 | A1 | 1/2015 | Smith et al. |
| 2016/0155175 | A1 | 6/2016 | Isaacson et al. |
| 2016/0283951 | A1 | 9/2016 | Boss et al. |
| 2017/0011383 | A1 | 1/2017 | Melzer |
| 2017/0279747 | A1 | 9/2017 | Melzer et al. |
| 2018/0182014 | A1 | 6/2018 | Cheng |

OTHER PUBLICATIONS

Pierce, David, "Super-Smart Apps are Invading our Keyboards", web article dated Sep. 22, 2015, retrieved from https://www.wired.com/2015/09/keyboards-invaded-super-smart-apps/, Wired, 9 pages.

"ThirstyAffiliates Autolinker Add-On", webpage retrieved on Apr. 19, 2017, retrieved from https://thirstyaffiliates.com/product/thirstyaffiliates-autolinker-addon, 6 pages.

Grant, Rebecca, "SkimLinks helps publishers nail affiliate marketing, no wooing required", web article dated Apr. 22, 2013, retrieved from https://venturebeat.com/2013/04/22/skimlinks-helps-publishers-nail-affiliate-marketing-no-wooing-required/, Venture Beat, 4 pages.

"Skimlinks Launches SkimWords 2.0, an Advanced In-text Monetization Solution Driving E-Commerce", web article dated Oct. 26, 2011, retrieved from http://www.prnewswire.com/news-releases/skimlinks-launches-skimwords-20-an-advanced-in-text-monetization-solution-driving-e-commerce-132606883.html, PR Newswire, 3 pages.

Webpage retrieved on Apr. 19, 2017, retrieved from http://www.affilinker.com/affiliate-wordpress-plugin/, AffiLinker, 10 pages.

"Transform your sit into a thriving ecommerce business", Webpage retrieved on Apr. 19, 2017, retrieved from http://www.viglink.com/, VigLink, 4 pages.

"Instant Links Inserter—Convert Words to Links", Webpage retrieved on Apr. 19, 2017, retrieved from http://www.affiliateswitchblade.com/content-creation/instant-links-inserter.htm, Affiliates Switch Blade, 9 pages.

Patterson, Ben, "Too much tapping? Create your own Android and iOS keyboard shortcuts", web article dated Nov. 14, 2014, retrieved from http://www.pcworld.com/article/2847469/too-much-tapping-create-you-own-android-and-ios-keyboard-shortcuts.html, Pcworld, 2 pages.

"How to use Shortcuts with SwiftKey Keyboard for Android", web article retrieved on Apr. 19, 2017 from https://support.swiftkey.com/hc/en-us/articles/213711789-How-to-use-Shortcuts-with-SwiftKey-Keyboard-for-Android, SwiftKey Support, 3 pages.

Raj, Vijay, "Meet Xploree, an Intelligent NLP Powered Keyboard for Android", web article dated Nov. 19, 2016, retrieved from https://www.tech.ink/1324/meet-xploree-keyboard-android, Tech Ink, 10 pages.

"What's the difference between predictive keyboards and predictive text?", web article dated Nov. 12, 2014, retrieved from https://blog.swiftkey.com/whats-difference-predictive-keyboards-predictive-text/, SwiftKey Blog, 5 pages.

Henry, Alan, "How Predictive Keyboards Work (and How You Can Train Yours Better)", web article dated Oct. 8, 2014, retrieved from http://lifehacker.com/how-predictive-keyboards-work-and-how-you-can-train-yo-1643795640, Lifehacker, 10 pages.

International Search Report and Written Opinion received in PCT/US18/25223, dated Jun. 22, 2018 (6 pages).

International Preliminary Report on Patentability received in PCT/US2018/25223, dated Mar. 29, 2018 (4 pages).

\* cited by examiner

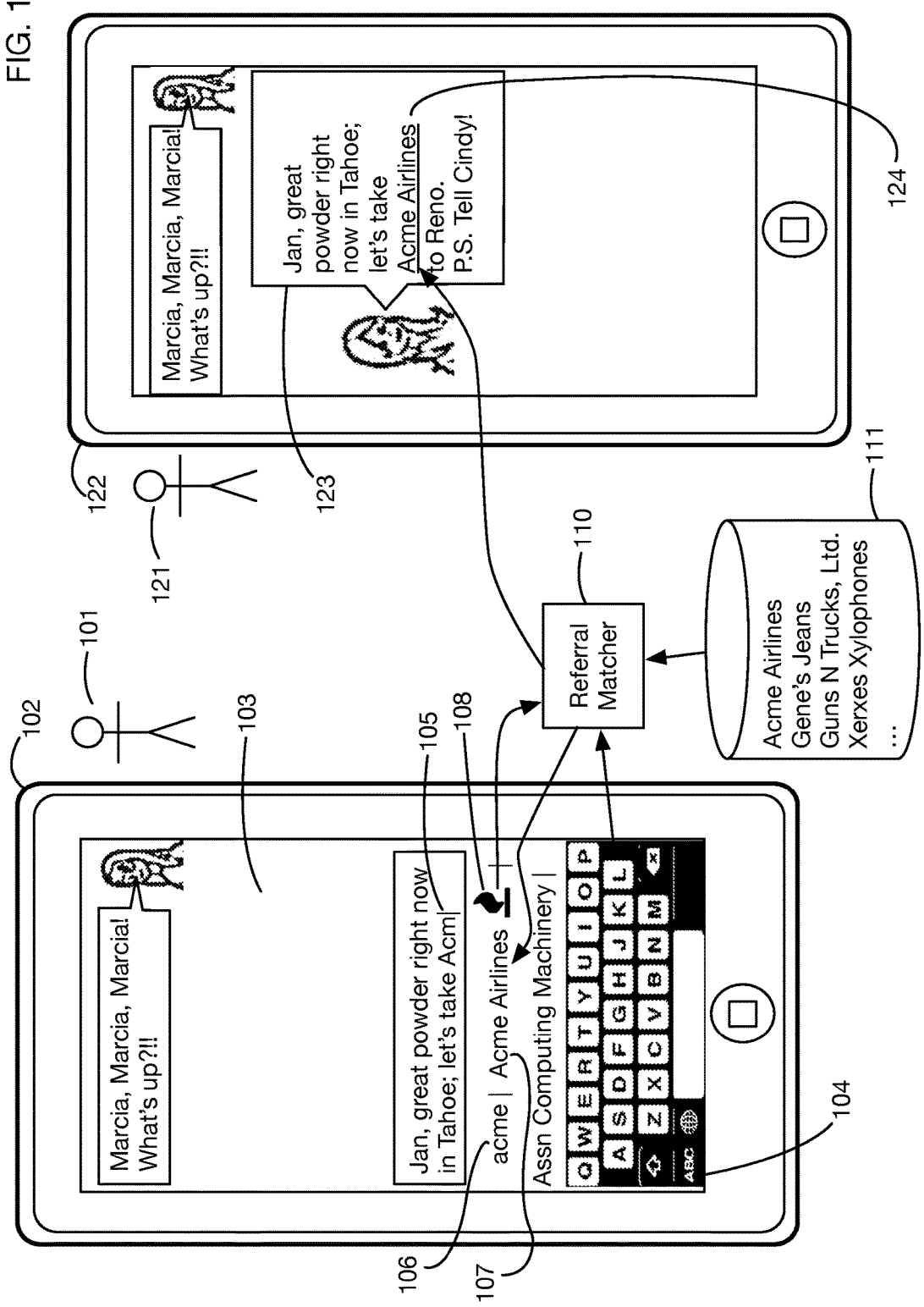

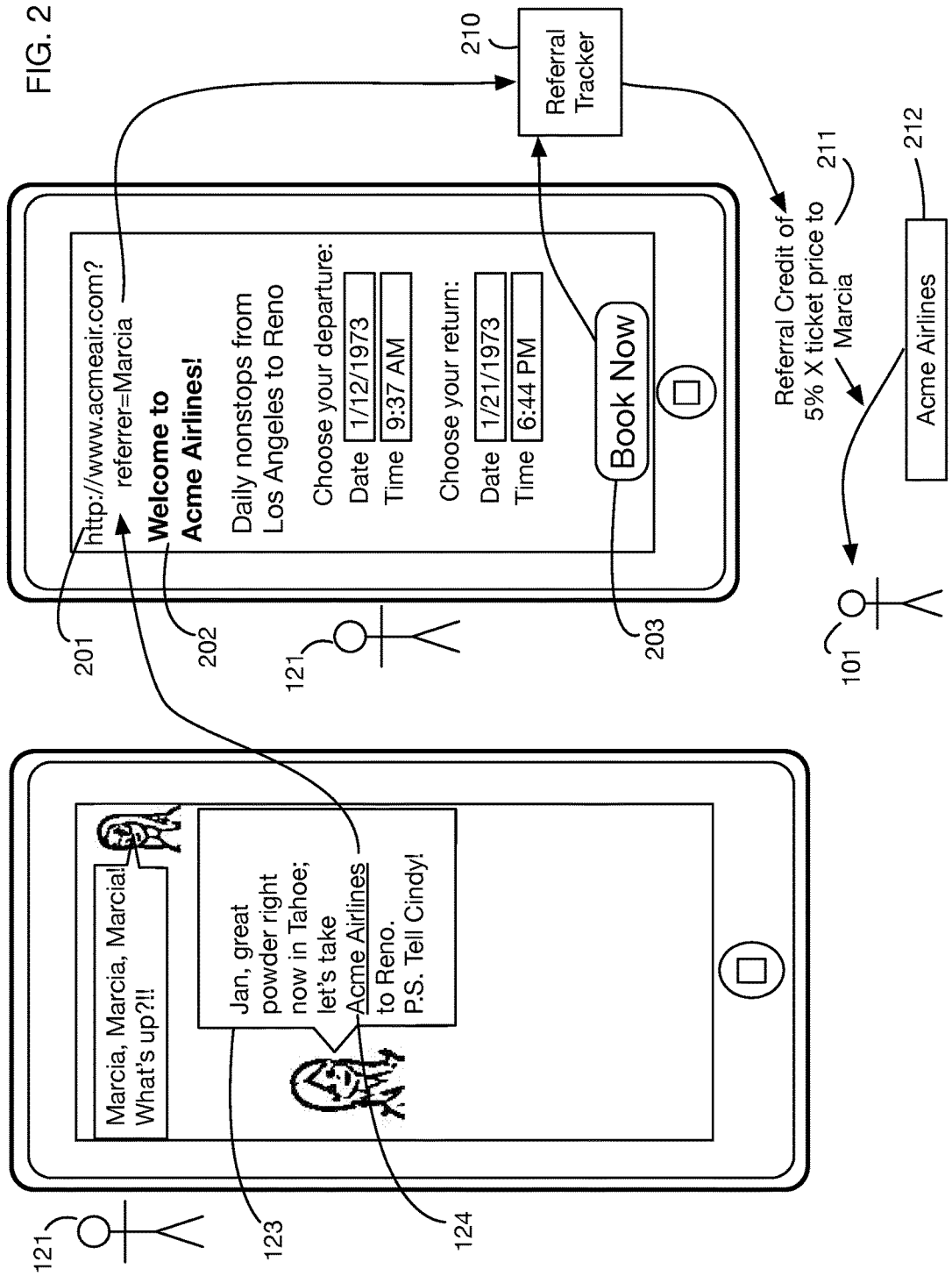

Keyboard Input Process Flow

Process Flow with Two Stage Referral Matching

Image Input Process Flow

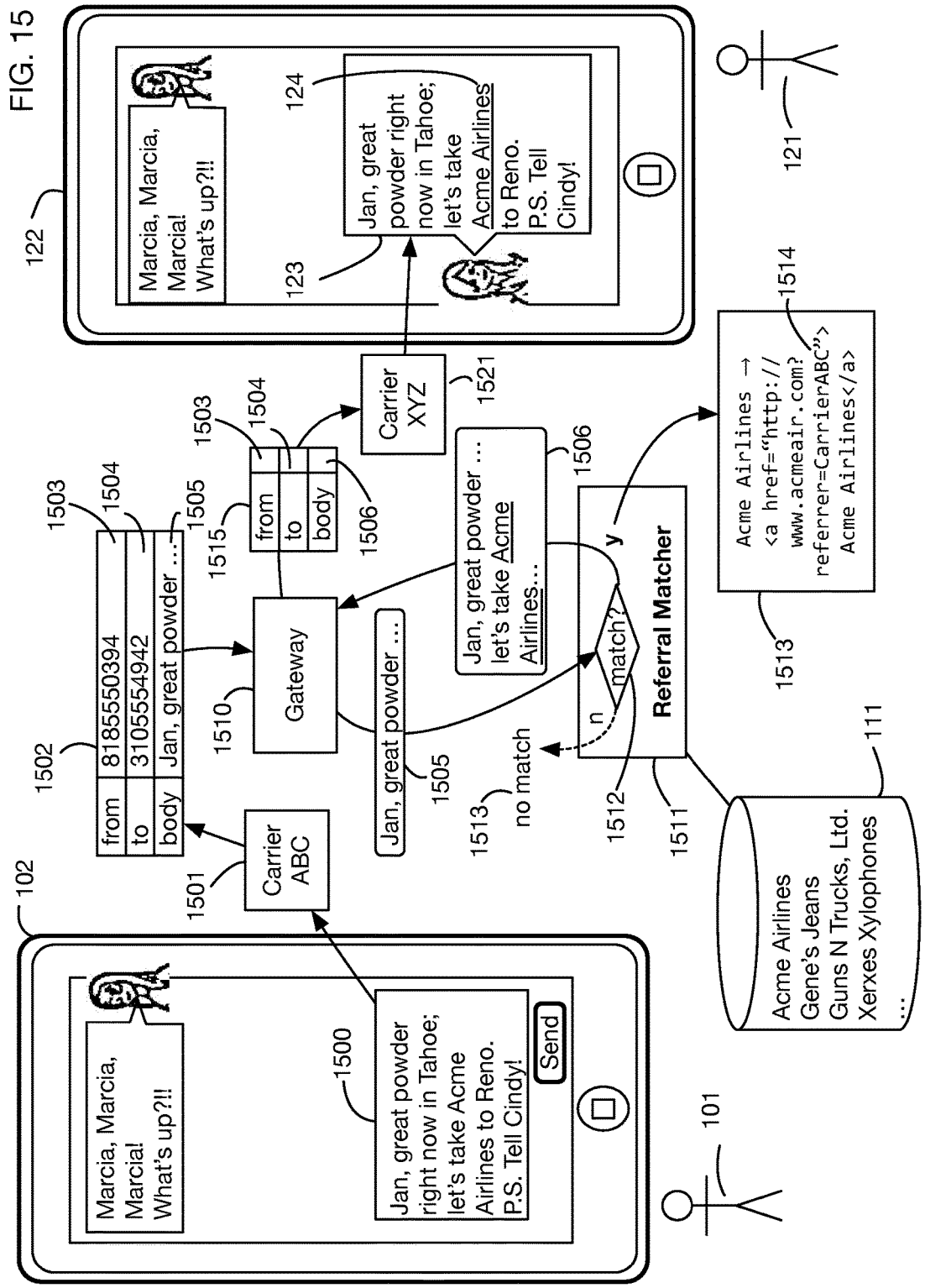

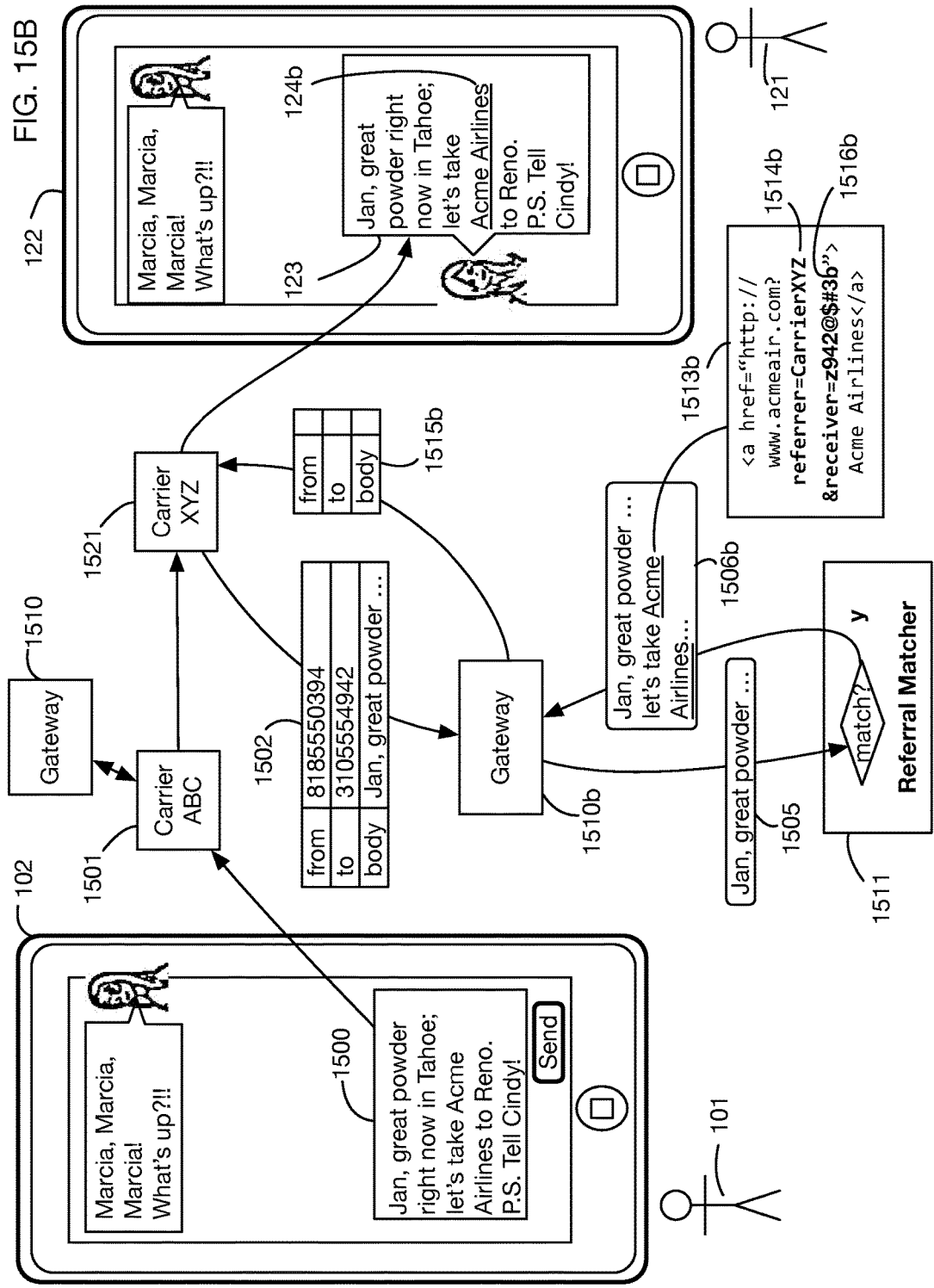

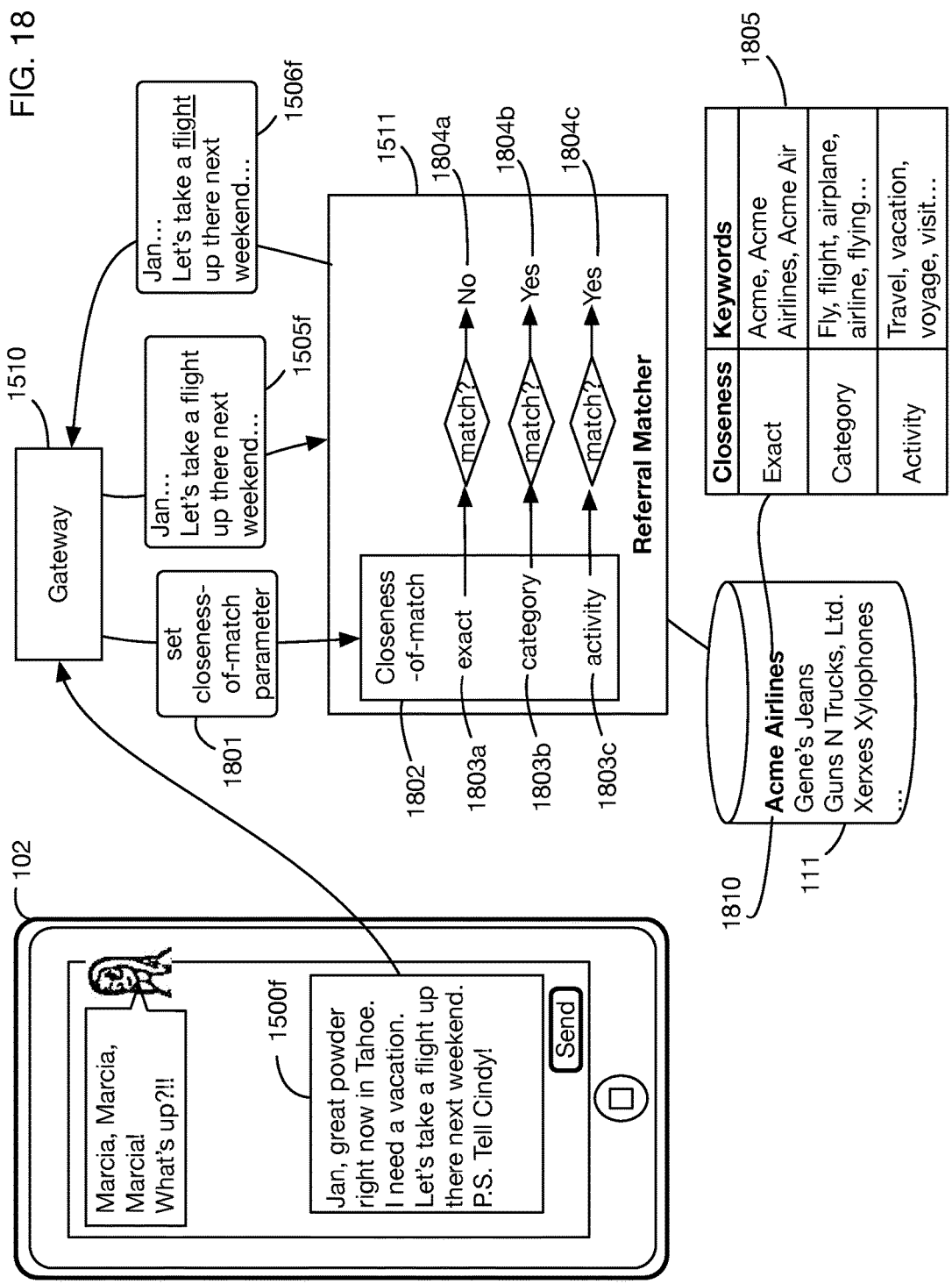

MESSAGING GATEWAY MONETIZATION SYSTEM

This application is a continuation-in-part of U.S. Utility patent application Ser. No. 15/826,585 filed 29 Nov. 2017, which is a continuation of U.S. Utility patent application Ser. No. 15/706,637 filed 15 Sep. 2017, issued as U.S. Pat. No. 10,169,770, which is a continuation-in-part of U.S. Utility patent application Ser. No. 15/483,791 filed 10 Apr. 2017, issued as U.S. Pat. No. 10,229,427, the specifications of which are hereby incorporated herein by reference.

BACKGROUND OF THE INVENTION

Field of the Invention

One or more embodiments of the invention are related to the fields of data processing, electronic communication systems, digital advertising, referral reward systems for example as related to electronic commerce. More particularly, but not by way of limitation, one or more embodiments of the invention enable a messaging gateway monetization system, for example that utilizes at least one computer and at least one application specifically programmed to integrate trackable referrals into digital communications including but not limited to peer-to-peer networks and track the referrals to monetize the communications.

Description of the Related Art

Several technology platforms exist for digital promotion of advertisers, brands, products, and services. However, these existing platforms fail to address digital word-of-mouth promotion, or peer-to-peer digital communications, where one consumer or user promotes or mentions a brand, product, merchant or service to one or more other users. Existing platforms include affiliate networks, social marketing, referral marketing, and influencer marketing. None of these existing platforms adequately address digital word-of-mouth promotion.

Affiliate networks are designed for professional content creators and digital publishers. These networks are not appropriate for digital word-of-mouth promotion, because consumers are generally unable or unwilling to participate in the potentially painstaking processes required to join an affiliate network, and to perform the steps involved in utilizing an affiliate network.

Social marketing platforms are typically limited to display of advertisements on social networks. As such these platforms are not actually "social" since they do not directly involve communications between consumers; instead ads simply appear adjacent to social interactions, sometimes utilizing optimization software, for example to make the ads contextually relevant to the social interaction.

Referral marketing platforms generally involve customized, one-off campaigns on behalf of an individual advertiser. These platforms are not built as a platform for digital word-of-mouth promotion across multiple products, services, or brands.

Influencer marketing platforms enlist influencers with large audiences for one-off campaigns. These platforms do not address true digital peer-to-peer word-of-mouth referrals among family and friends, for example.

There are no known platforms that provide practical and effective digital word-of-mouth referral capabilities in digital communications. There are no known platforms that are unobtrusive, automatic, simple, easy to use, intuitive, and that fit naturally within a peer-to-peer social dialogue. There are no known platforms that apply to essentially all prominent digital channels that people use to communicate with friends, family, and colleagues, such as social media, messaging applications, email, and SMS. There are no known platforms that easily enable people to embed trackable referral links within their digital communications with peers, provide rewards to the referrers, including cash-based incentives, and that provide a broad range of coverage of things the user recommends. There are no known platforms that integrate naturally within social dialogues and are helpful to the recipient, transparent, and non-promotional.

Some existing systems facilitate insertion of referral links into specific documents, such as blogs or web pages. These systems may for example be tools provided by affiliate networks, or plugins for web publishing tools such as WordPress®. A significant limitation of these systems is that they are coupled to specific applications or use cases. There are no known systems that integrate referral generation into general-purpose user input methods, such that the referral generation capability can be used across multiple applications or use cases.

There are also no known systems that provide a transparent method of detecting referrals within message content, inserting trackable referral links into communications with no action required on the part of the sending or receiving users, that protects the privacy of the sending and receiving users, and that rewards message intermediaries for inserting relevant referral links into messages.

For at least the limitations described above there is a need for a messaging gateway monetization system that generates trackable referrals in digital communications between a referring user and a receiving user, and tracks referrals in a manner that is universal for all methods of communication between the referring user and the receiving user, and that maintains privacy and credits intermediaries.

BRIEF SUMMARY OF THE INVENTION

One or more embodiments described in the specification are related to a messaging gateway monetization system that generates trackable referrals in digital communications and tracks the referrals to provide rewards. Embodiments of the invention may enable communication intermediaries or users to integrate referrals to participating merchants into communications; recipients of these referrals may digitally access the referred merchant, and the system may provide a credit to the referrer or a communications intermediary if a recipient completes a transaction with the referred merchant. Referral generation may be integrated into a mobile device operating system or application or may be integrated within a server or messaging gateway through which messages are conveyed, so that the referral capability may be used across multiple applications and for multiple use cases. A communications intermediary may be for example: a provider or operator of a communications channel or service; a provider or operator of a communications link or service anywhere in the path of a message between a sender or receiver; or a provider or operator of a messaging gateway or platform that may receive, store, forward, route, convey, direct, resend, transform, format, analyze, combine, filter, translate, edit, post, display, or otherwise handle any communication or message.

One or more embodiments of the invention include a database of one or more of participating merchants, a referral matcher that generates referrals to these merchants, and a referral tracker that tracks when a referral results in a transaction. The referral matcher may receive input from a referring user, for example as part of a communication generated by this referring user; it may then analyze this input to identify one or more products, services, merchants, brands, or promotions in the database that match the input. The referral matcher may then automatically generate a referral link and may insert this referral link into the communication. The referral matcher may automatically insert the referral link into the communication, or the referral matcher may prompt the referring user or receiving user to agree to the insertion of the referral link and may then insert the referral link into the communication. The referral link may also incorporate an identifier of the referring user or the communications intermediary, so that the referral may be tracked. A recipient, or receiving user, of the communication, may use the referral link to access a website or "site" or commerce site associated with the referred merchant. If the recipient performs a task, for example a transaction on this commerce site, the referral tracker generates a credit for the successful referral. This credit may be collected from the referred merchant. All, none or a portion of the credit may be remitted to or otherwise associated with the referring user or communications intermediary.

One or more embodiments of the system may analyze input associated with any type of digital communication, including for example, without limitation, a text message, an email message, a communication via a social media site, a posting on a message board, a communication via a messaging app, a Twitter® message, a Facebook® post, a Snapchat® message, a voice message, a voice signal that is converted to text, a video message, a picture message, a communication via Facebook®, a communication via social media, a communication via a shopping site, a communication via a message board, a posting to a product review service, a digital communication, a comment posted to a digital media service, and a communication via a messaging application.

In one or more embodiments, a communication from a referring user may include or may be generated by sharing of information via a share button or other sharing capability. A share button may for example be a native share button in a web browser or mobile operating system (such as iOS® or Android®), or it may be a button or an icon on a website or on any other document or application.

In one or more embodiments, a referral tracker may generate a feedback message to the communications intermediary or referring user that indicates that a recipient has executed a transaction as a result of the referral. In addition to or instead of feedback, the referral may generate a credit to the communications intermediary or referring user, which may for example be a monetary payment or another type of reward. In one or more embodiments, the referral credit may be provided to a group of users. In one or more embodiments, the referral credit may be shared with the recipient as a result of executing the referred transaction. In one or more embodiments, the referral credit may be a donation to another organization, for example a non-profit or charitable organization, made for example on behalf of the referring user.

Input into a referral matcher may be obtained from any type of physical device, application, utility, or software program, or combination thereof, and it may be in any format. For example, in one or more embodiments the referral matcher may be coupled to a physical or virtual keyboard used by the referring user, and it may accept and analyze keystrokes obtained from this keyboard. In one or more embodiments, the referral matcher may be coupled to an image capture device, such as for example a camera on a mobile device; the referral matcher may analyze images to determine matching products, services, merchants, brands, or promotions. Images may be for example, without limitation, images of barcodes (linear and 2D codes such as QR codes), or images of a product. In one or more embodiments, the referral matcher may be coupled to an audio input device, such as for example a microphone on a mobile device; the referral matcher may perform voice recognition and analysis to determine matching products, services, merchants, brands, or promotions for example associated with the inferred reference in the communication. In one or more embodiments, the referral matcher may be coupled to software which analyzes content such as voice, images or video; the referral matcher may analyze this content in any manner to determine matching products, services, merchants, brands, or promotions for example associated with the inferred reference in the communication In one or more embodiments, the referral matcher may be coupled to a messaging service, communications platform, network, gateway, server or other application which conveys, transmits, routes, directs, receives, stores, forwards, resends, transforms, analyzes, combines, filters, translates, formats, edits, posts, displays, or otherwise handles messages or communications of any type or types. A message may contain for example, without limitation, any type or types of content such as any combination of text, image, voice, audio, video, animations, code, software, links, URLs, website addresses, attachments. The referral matcher may perform analysis of content that is being transmitted to detect matching products, services, merchants, brands, or promotions for example associated with the inferred reference in the communication.

In one or more embodiments, the referral matcher may be coupled to a social media service, digital media service or messaging application, such as for example, without limitation, Facebook®, Whatsapp®, Twitter®, Yelp® or Snapchat®; the referral matcher may perform analysis of content that has been input to such an application to determine matching products, services, merchants, brands, or promotions for example associated with the inferred reference in the communication.

In one or more embodiments, the referral matcher may be coupled to the recipient's device, an application used by the recipient, a messaging gateway or network through which messages are conveyed to the recipient's device; the referral matcher may perform analysis of content that is conveyed to the recipient to determine matching products, services, merchants, brands, or promotions for example associated with the inferred reference in the communication.

In one or more embodiments, a referring user may be able to select text (or other items) in a communication, and initiate a search for listings in the merchant database matching the selection.

One or more embodiments may use language processing and analysis techniques to identify words, phrases, text strings, or other elements in the input that are associated with one or more products, services, merchants, brands, or promotions in the database. These techniques may include for example, without limitation, natural language processing, collaborative filtering, artificial intelligence, affect analysis, type-ahead, predictive analytics, machine learning, recommendation engine, and personalization engine. One or more embodiments may process and analyze any other types of content, such as images, video, audio, speech, links, code, URLs, website addresses, links to mobile applications, or animations, to identify items that are associated with one or more products, services, merchants, brands, or promotions in the database. For example, image processing may identify images of items that are associated with entries in the database or with categories of entries. As an illustration, images in a message may be processed by a neural network or other classifier to identify the types of items in the images; if a message contains images of a car, for instance, database entries corresponding to car sales or car rentals may be matched and one or more associated referral links may be inserted into the message.

If multiple merchants in a database are identified by the referral matcher as potential matches, based on the communication between the users, the system may ask the referring user to select from among the multiple matches. In one or more embodiments, the system may select a specific merchant automatically. Selection of a merchant may be based on any factor or factors on which merchants may be rated, scored, measured, or compared, including for example, without limitation, the size or amount of the referral credit associated with each merchant, the location of the merchant, the availability of inventory, speed of fulfillment of orders, ratings or reviews related to the merchant, or the price of the product or service offered by the merchant. The referring user and receiving user may both set preferences that for example invoke a strategy pattern to determine the merchant to provide a referral to, or to generate an ordered list of merchants. For example, the system may automatically select the merchant having the largest referral credit, or automatically select the merchant having the lowest price, quickest delivery time, etc. In one or more embodiments, the referral may be made based on the recipient's preferences, so that the recipient's favorite merchant's may be inserted into a list presented to the referring user and/or by the receiving user in one or more embodiments. In one or more embodiments, the referral may be made based on business rules determined by the communication intermediary. Other strategy instances may be utilized to correlate the preferences of the referring user with the preferences of the receiving user to find the most appropriate referral as well.

One or more embodiments may incorporate settings which enable the referring user or the receiving user to control the frequency and manner in which the referral matcher presents matching merchants and may prompt the referring user or receiving user to agree to the insertion of the referral link.

In one or more embodiments, a referral link may initially direct a recipient to an intermediate server or system; this intermediate server may then redirect the recipient to a target destination related to the referral. The intermediate server may perform additional processing to determine which target destination is appropriate or optimal for the referral. For example, without limitation, in one or more embodiments the referral matcher executing on a referring user's device or coupled with a network or messaging gateway may perform an initial match that simply identifies that a relevant product, service, brand, or merchant exists, or that selects a broad category or grouping of potentially matching products, services, merchants, brands, or promotions. The referral link associated with this initial match may direct the recipient to the intermediate server, which may then perform an additional matching step to select a specific merchant, site, page, or other destination to complete the referral. The redirection link generated to this final destination may contain the same or similar tracking information (such as an identity of the referring user or communication intermediary) so that the referrer or communication intermediary may obtain credit for a successful referral. The redirection link may direct the recipient for example to any or all of a web site, another server, another intermediate server, a web service, a specific web page, an application, a URL, or a URI. A potential benefit of this two-stage matching process using an intermediate server is that the database accessible to the referral matcher can be smaller, and does not need to be updated in real time. The processing for the initial match may also be faster and less resource intensive and may reduce the latency of the creation and transmission of the message. The matching and final selection process on the intermediate server may access more detailed information on products, service, or merchants, including potentially information that is updated in real time (such as merchant bids for referrals). This second stage of matching and selection may also utilize more computing resources available on a server or a network of servers.

One or more embodiments may provide or access a dashboard or other reporting system which enables the communication intermediary or referring user to access information about the referral links sent, and may include, without limitation, information regarding the amount of referral credit earned, the identity of the recipients which conducted transactions, the identity of the merchants with which transactions have occurred as a result of their referrals, and the communications platforms through which the referrals were sent.

One or more embodiments may present a referrer profile page which may be public facing and which may display brand, product and service referrals with referral links. In one or more embodiments, this enables a more graphical interface for receiving users to select referrals that generate rewards for the referrer. In one or more embodiments, a communication may be generated that includes a link to a site that allows for graphical selection of a particular merchant for example by the receiving user.

One or more embodiments may include a mechanism which enables the referring user, while on a web page, to select the URL or other indicator of such web page, and create a referral link to that page which may include an identifier of the referring user, so that the referral may be tracked, and enable the referring user to insert this referral link into a digital communication.

In one or more embodiments, a referral link may be, may contain or may lead to a coupon for a product or service, instead of or in addition to a link to a site. The coupon may be for example in the form of a code, a printable document, a UPC code, a QR code, a promotional code, a ticket, an image, or another identifier. The recipient may use the coupon for example for either online or offline transactions; in an offline transaction, the recipient may for example transact with a via an interaction which does not get tracked via a link to a site.

In one or more embodiments, referral links may be added by a communication intermediary in a communication path between a sender and receiver. The intermediary may receive a communication from the sender to a receiver. The communication may contain any or all of an identifier of the sender, an identifier of the receiver, and a communication body. The intermediary may transmit the communication or any portion thereof to a computer that executes a referral matcher. For example, the referral matcher may execute on a network gateway or on a server as a web service. The referral matcher may be coupled to the communication intermediary (and associated messaging gateway) associated with the sender, the recipient or both. The referral matcher may analyze the communication to determine whether there are any matches to listings in the referral database. When a match is found, the referral matcher may transform the communication to insert a referral link to a site or other resource associated with the matched item from the database. The link may also contain an embedded referral tracking code that identifies the referrer, which may be any combination of the sender, the receiver, or the intermediary. The transformed communication may be returned to the communication intermediary, which transmits it along the communication path to the receiver. If a receiver uses the link and completes an associated task (such as a purchase), a referral tracker may receive a notification of the transaction with the embedded referral tracking code, and credit the referrer for the transaction.

In one or more embodiments, when a match is found, the referral matcher may convey to the communication intermediary instructions as to how to transform the communication to insert a referral link to a site or other resource associated with the matched item from the database and embed a referral tracking code that identifies the referrer, which may be any combination of the sender, the receiver, or the intermediary. The communication intermediary may then execute the instructions and transmit the transformed communication along the communication path to the receiver.

A communication intermediary may be for example, without limitation, one or more of a communications carrier, a wireless provider, a cellular provider, a network provider, an internet service provider, a social media platform, a messaging service, a telephone service provider, a broadband service provider, a Wi-Fi provider, an email service, a text message service, a mobile application, a software application, a chat service, an application which conveys, transmits, receives, routes, forwards, stores, directs, edits, filters, or formats communications, or a gateway between any types of devices, networks, routers, or nodes. A communication may be or may contain for example, without limitation, one or more of a message, a text message, an email message, a voice message, a video message, a website link, a link to a mobile application, a picture message, a transcribed message, a communication via social media, a communication via a shopping site, a communication via a message board, a posting to a product review service, an encrypted message, a digital communication, a comment posted to a digital media service, and a communication via a messaging application. In one or more embodiments, the receiver of a message may use a referral link by performing one or more of a tap, click, gesture, response, user interface interaction and verbal command. The associated task may be one or more of a click, view, visit, transaction, purchase, reservation, subscription, sign-up, submission, software installation, download, inquiry, content consumption, survey completion, and participation in a digital interaction.

In one or more embodiments, the referral link may link for example, without limitation, to one or more of a website, a software application, an e-commerce service, a merchant shopping cart, a mobile application, a computer application, a store, a redirector, a link-tracking service, an affiliate network, a video player, a coupon or coupon code, a promotion or promotion code, a discount code, a transaction code, a mapping service and a URL. The listings in the referral database may be for example, without limitation, one or more of a product, a service, a brand, a merchant, a name of a merchant, a name of a web site, a name of a product, a name of a service, a location, a review, a rating, a product number, a model number, a description, a picture, an image, a diagram, a barcode, a UPC number, an RF code, an activity, a keyword, a phrase, a product category, an SKU, an instruction, a suggestion, a solution, an information source, a person, an organization, and a professional. The database may be for example, without limitation, one or more of a file, library, catalog, directory, open graph, real-time web search, cached web search result and data feed.

In one or more embodiments, the processing performed by the referral matcher may determine whether content such as a word, phrase, text string, URL, website link, website address, link to a mobile application, domain name, image, audio or video component, or code in the communication body corresponds to a listing in the referral database; if so, the link may replace or be inserted around that matching content. In one or more embodiments, processing may also perform sentiment analysis to determine the sentiment in the communication towards the matched item.

In one or more embodiments, the referral matcher may have a configurable closeness-of-match parameter that determines how closely the communication must correspond to a database item in order to generate a referral link.

In one or more embodiments, processing may also determine whether a communication indicates a subcategory associated with a matched item. Subcategories associated with database listings may include for example, without limitation, one or more of a size, a style, a model, a type, a sub-brand, a feature, a name, a category, a quality, a stock keeping unit, a characteristic, a color, a date, a time, a location, and a quantity. If subcategory data is identified in a communication, the referral link may include this data, for example by linking to a specific web page or by incorporating URL parameters in the link.

In one or more embodiments, a referral credit may be provided to one or more of the communication intermediary, the sender and the recipient. The sender's and recipient's identity may be encoded to protect privacy before it is passed to the referral matcher.

In one or more embodiments, either or both of the sender or receiver of a message may be able to send a message to opt-out of having referral links added to communications. For senders or receivers who opt out, the referral matcher may not add links to messages for those users. One or both of the sender or receiver may be able to send a message to modify communications preferences that affect when, how, or how frequently referral links are added, how they are used, or how they are displayed.

In one or more embodiments, when a referral matcher identifies more than one possible site that corresponds to a listing that is a match in a communication body, it may select a site based on a performance metric, such as for example, without limitation, the amount of referral credit associated with the site, a price associated with the site, a degree of similarity between the site and the communication, a transaction conversion rate associated with the site, a defined set of business logic associated with the site, how closely characteristics of the sender or receiver correspond to the site, proximity of the site to the sender or receiver's location, a location associated with the site, a speed of fulfillment associated with the site, a review score, a popularity score, or a rating score associated with the site.

In one or more embodiments, the referral link may link to an intermediate server, and the intermediate server may select a final destination when a message recipient clicks on or otherwise interacts with a referral link, and may then redirect the recipient to that final destination. To select a destination from multiple possible destinations, destinations may be compared on a performance metric such as the metrics described above.

BRIEF DESCRIPTION OF THE DRAWINGS

The above and other aspects, features and advantages of the invention will be more apparent from the following more particular description thereof, presented in conjunction with the following drawings wherein:

FIG. 1 shows an example of a user using an embodiment of a messaging gateway monetization system that accepts input from a referring user and automatically determines or otherwise infers merchants associated with products and/or services to refer based on the input, i.e., to match referrals with the input, and insert the referral into a message to a recipient that contains a trackable product or service referral.

FIG. 2 continues the example of FIG. 1, showing the recipient receiving and using the referral, and the system crediting the referrer for the successful referral.

FIG. 15 shows an illustrative system with a referral matcher that operates at a gateway, rather than on the sender's device, and that identifies a communication intermediary as the referrer.

FIG. 15B shows another variation of the embodiment of FIG. 15, where the gateway that invokes the referral matcher is associated with the receiver's communications carrier rather than with the sender's communications carrier.

FIG. 18 shows an illustrative embodiment that provides a configurable degree of closeness of match for the referral matcher.

DETAILED DESCRIPTION OF THE INVENTION

Figure 1A:
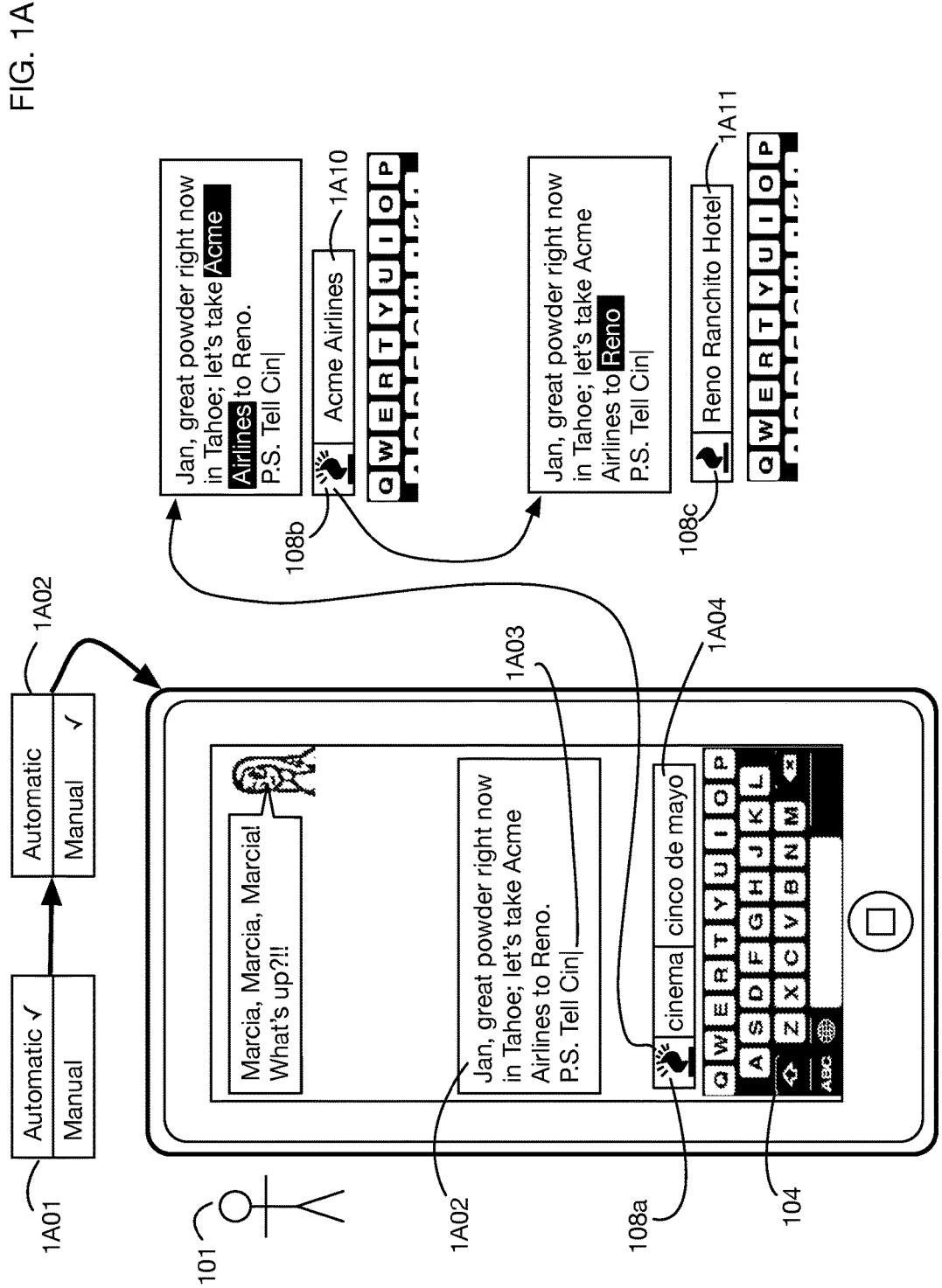
FIG. 1A shows a variation of the example of FIG. 1, where the referral matching system operates in a manual mode that requires user action before showing suggested referrals.

A messaging gateway monetization system will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

FIG. 1 shows an illustrative embodiment of the invention, illustrating the generation of a referral for example as part of a peer-to-peer communication. (FIG. 2, described below, continues this example to show how a referral is processed by the system when used by a recipient.) User 101, the referring user, uses mobile device 102 to generate a communication to one or more other users. In this example, user 101 composes a text message to user 121. One or more embodiments may integrate referrals into any type of communication and independent of the application used, including but not limited to text messages, emails, SMSs, voice messages, picture messages, video messages, chat messages, Twitter® messages, Instagram® messages, messages sent via messaging platforms including for example without limitation WhatsApp®, Snapchat® or Facebook® Messenger, and postings on any websites or services including for example, without limitation, social media sites such as Facebook®, Tumblr®, Google+®, YouTube®, Vine®, Pinterest®, Flickr®, or LinkedIn®. In one or more embodiments users may use any type or types of devices to send or receive communications and to generate, receive, or use referrals, including but not limited to a mobile device such as device 102. For example, without limitation, users may use mobile devices, cell phones, smartphones, tablets, laptop computers, notebook computers, desktop computers, server computers, smart speakers, smart watches, wearable devices, communication devices built into vehicles, smart glasses, augmented reality devices, content management systems, virtual reality devices, or networks of any of these devices. Users generating referrals may use the same devices or different devices from those used by users receiving and using referrals.

A referring user and a receiving user may each be any person, system, organization, group of persons, robot, application, business, or agency that communicate in any manner over any medium. For example, without limitation, a referring user may be an individual, a professional content creator, an editor, an author, or a business. A user may be acting on his or her own behalf, or on behalf of a business, an organization, or an agency. Recipients of a communication from a referring user may be peers, family, friends, known or unknown persons or groups, readers, business contacts, or followers of a feed or blog. Recipients may be individuals or they may be groups or audiences of any size and composition. Although the term receiving user is used in the singular in certain scenarios herein, receiving user means one or more users that receive a communication from the referring user.

In the example shown in FIG. 1, user 101 is typing a message with the cursor 105 midway through a word. The user types the message using a virtual keyboard 104 as utilized in one or more embodiments on the mobile device or electronic device 102. In this embodiment, the system, which includes virtual keyboard 104 accepts the input, here text characters and transmits the text characters to a referral matcher 110. Referral matcher 110 receives input from the virtual keyboard 104, and may suggest potential referrals based on the keystrokes received from the keyboard. The referral matcher may execute directly on the mobile device 102, or it may execute on another device (such as a server or a cloud or Internet accessible service) remote from the mobile device 102, or any combination thereof. The referral matcher 110 accesses a database 111. The database may contain for example, without limitation, products, services, merchants, brands, promotions, locations, places of business, stores, events, persons, performers, or any related characteristics. In one or more embodiments, a computer or server that executes the specific instructions to implement the referral matcher may also host the database or in other embodiments, the database may be remote to the computer that hosts the database. In one or more embodiments, the referral matcher may access any number of data sources to identify potential referrals. These data sources may be local to the mobile device (or other device) 102, or remote from the mobile device (for example, on a server accessible via the Internet or via any other network connection). Database 111 may contain any information that may be used to locate or create a referral, or to select from or prioritize among multiple matching merchants, such as for example, without limitation, the name or names of a merchant, the name or names of a web site, the name or names of products or services, brand names, the location of merchants, reviews or ratings of products, services, or merchants, product numbers, SKU numbers, model numbers, descriptions, pictures, images, diagrams, barcodes, UPC numbers, RF codes, the amount a merchant pays for referrals, information on any promotions, or any data derived from or related to any of this information, including any generic categories that may infer one or more merchants, for example airline or flight or fly to infer a particular merchant that provides air travel services.

Database 111 may for example include information about and characteristics of merchants, such as merchant names, ratings, reviews, conversion rates, locations, and hours. A merchant may be for example, without limitation, a company, organization, individual, or other entity that makes, sells, or distributes products or services available for a user to purchase, consume, or enjoy. A merchant may be for example, without limitation, a retailer, a service provider, an e-commerce service, a sales agent, a salesperson, a manufacturer, or a distributor. A merchant may be associated with an intermediary. Database 111 may for example include information about one or more intermediaries. An intermediary may be for example, without limitation, an agency, a marketing firm, an affiliate network, a referral marketing provider, or any other individual or entity that represents a merchant and to which a link may be directed or through which a link may be redirected. Database 111 may for example include information about products and services, such as the products and services provided by a merchant or an intermediary. This information may include for example, without limitation, product names, descriptions, alternate references (for example "flights to Denver"), pricing, and inventory availability. Products and services may be for example, without limitation, any good that a user can purchase, enjoy, or consume; these may be physical products, virtual products (such as digital content, movies, music, or other formats), or services. Database 111 may for example include information on one or more brands, such as for example, without limitation, a trade name of a product, service, manufacturer, marketer, or retailer. Database 111 may for example include information on one or more promotions, such as for example, without limitation, information regarding discounts, special sales, cash-back offers, and new user rewards, which a merchant may offer relating to sales of its products and services.

In the example of FIG. 1, referral matcher 110 analyzes keystrokes from virtual keyboard 104 and compares these keystrokes to the names and other information in database 111, and determines that item 107 is a potential match. In a simple example, "Acm" may be compared to any items in database 111 that being with "Acm" such as "Acme", "Acme Airlines" or that is associated with an acronym for text in the database, i.e., "ACM" that standards for "Association of Computing Machinery". In other embodiments, words such as "flight" may be associated in database 111 with all merchants that are airlines. Any schema may be utilized to provide potential matches and contain any number of associations for each merchant, product or service to compare with. It therefore provides this item as a suggested completion for the virtual keyboard input. The virtual keyboard application may also provide other suggested completions such as completion 106, which may not correspond to a referral. Suggested referrals may be identified for example using an icon such as icon 108. If the user 101 selects the suggested referral 107, which may be performed in one or more embodiments with a single tap on the suggested referral, a referral link 124 with this referral may be generated and placed into the message 123. In other embodiments, the link may be automatically inserted based on preferences or any strategy pattern employed by the system. After the user completes and sends the message, user 121 receives the message on device 122. The message 123 includes the referral link 124 generated by the referral matcher 110.

In the example shown in FIG. 1, the virtual keyboard application linked to the referral matcher 110 is used as input for a text messaging program. This same virtual keyboard application may be used universally with any other applications or services on mobile device 102, providing the same referral matching capabilities for these other applications or services without requiring altering each and every different communication application to including the trackable referral generation capability of embodiments of the invention. This flexibility illustrates a benefit of the system in providing a potentially general-purpose referral capability that may be used across multiple applications and services. For example, without limitation, the same keyboard 104 with referral icon 108 and referral matcher 110 may be used for an email application, a web browser, a chat application, a blogging application, a publishing application, a word processing application, or any other application used by user 101. In any of these applications, the referral matcher may analyze input from the keyboard and suggest potential referrals to be embedded in communications. This universal ability to generate trackable referrals regardless of the application in use in a peer-to-peer setting is unknown in the art and makes referral generation and tracking pain free and extremely easy to use for referring users.

In one or more embodiments, the referral matcher may be incorporated into an "app extension," including but not limited to a keyboard extension. This app extension may for example provide enhanced or alternate capabilities for user input features. For example, for a keyboard extension, the system may provide enhancements or replacements for keyboard features such as auto-correction, spell-checking, auto-completion (of words or phrases, using for example predictive text analysis), and databases of words and phrases such as a lexicon, dictionary, or thesaurus. In one or more embodiments, the referral matcher may be integrated within or coupled to an "app extension," including but not limited to a keyboard extension, such as for example Swiftkey®, iOS®, Swype® or Gboard®; the referral matcher may perform analysis of content that is input to such an app extension to determine matching products, services, or merchants, brands, or promotions for example associated with the inferred reference in the communication. For example, for a keyboard extension, the referral matcher may provide an alternate or complementary dictionary or lexicon for auto-completion, auto-correction, predictive text or spell-checking. In this example, the referral matcher may analyze input from a referring user, it may then analyze this input to identify one or more products, services, merchants, brands, or promotions in the database that match the input. The referral matcher may then automatically generate a referral link and may insert this referral link into the communication. The referral matcher may automatically insert the referral link into the communication, or the referral matcher may prompt the referring user to agree to the insertion of the referral link and may then insert the referral link into the communication.

The scenario illustrated in FIG. 1 is an example of the system working in "auto mode," where referral matches are automatically presented to the user as they are discovered by the referral matcher. One or more embodiments may also support a "manual mode," where the matcher 110 for example may work in the background but may not automatically show suggestions to the user 101. Instead, in manual mode, the keyboard or another element of the system may provide an indication or cue to indicate to the user 101 that there is a potential match. FIG. 1A illustrates an example of an embodiment operating in manual mode. User 101 configures the system to switch from automatic mode 1A01 to manual mode 1A01*a*. (This configuration may be performed for example using a settings screen or any other method of modifying the configuration of the referral system or the keyboard.) As the user uses virtual keyboard 104 to type input 1A02 as part of a message, the referral matcher may operate in the background to locate potential referrals related to the message, but it may not display these referral matches unless and until the user requests to see them. Text completion suggestions such as 1A04 may not contain referral suggestions initially; instead they may be simple text completions for the current word 1A03, rather than referral lookups. However, the referral matcher may provide an indication that it has located one or more matching referrals, in this example by changing the appearance of icon 108*a* (compared to the original icon 108 in FIG. 1). For example, without limitation, icon 108*a* may flash, blink, change color, change size, change shape, or otherwise change any aspect of its appearance as a notification of potential referrals. This changed icon signals to the user that potential referrals are available for review. In manual mode, the user 101 may for example single tap the icon 108*a* to indicate that the user wants to see the potential referral or referrals. In this illustrative example, the referral matcher locates two potential referrals, one for an airline and one for a hotel, by scanning and analyzing the input 1A02. A first tap on icon 108*a* shows the first potential referral 1A10 in the word completion area of the virtual keyboard. The user may for example tap on this referral 1A10 to insert it into the message 1A02. In this case, the appearance of icon 108*b* shows that there are more potential referrals. If the user taps icon 108*b* again, a second referral 1A11 is displayed. Again, the user may tap this suggestion 1A11 to insert the referral into the message 1A03. Icon 108*c* returns to its "normal" state (as in FIG. 1), indicating that there are no more potential referrals that have been located in this message text. This example is illustrative; one or more embodiments may use any type of user interface to present referral match suggestions to a user either automatically or in response to user actions. For example, a user interface may show all possible referral matches to a user simultaneously, instead of cycling through them as illustrated in FIG. 1A. One or more embodiments may also provide options for a user to select among several referrals, which may for instance correspond to different product categories. For example, the word "china" in a message may refer to the product category porcelain, or the country (which may suggest referrals related to travel); in one or more embodiments, the system may prompt the user to select between these options (although in some cases, embodiments of the system automatically determine the appropriate product category by analyzing the message context or historical data regarding the user's inputs).

One or more embodiments of the invention may analyze the user's input and manipulate the input to transform or augment references to items into any type of reference or trackable link. For example, the system may replace or augment an explicit item reference or an implicit item reference with one or more of: a hyperlinked version of the same content, a URL immediately after the matching content, a footnote-style reference to the item, or with any other format that contains a trackable link or similar reference. In each case, the system may replace or augment the contents of the message while keeping the original meaning of the content intact. In one or more embodiments, replacing or augmenting of message contents may be done automatically, either as the message is generated or prior to transmitting the message. In one or more embodiments, the system may offer to optimize the user's communication before it is sent, potentially at the user's explicit request. This optimizing of the user's communication may for example augment the communication such that a reference to an item includes characteristics that include tracking and attribution (such as the user ID and the item in the database).

FIG. 2 continues the example of FIG. 1. User 121 first receives message 123 containing referral link 124, as described above. The referral link may for example contain a link to a website or site or an e-commerce site corresponding to the referred merchant, product, or service. One or more embodiments may use any type or types of links or references, including for example, without limitation, a hyperlink, a URL, a shortened URL, a full URL, an image, a sound, a video, a short code, or a hashtag. In the example shown in FIG. 2 the link is a hyperlink for illustration. In one or more embodiments, this hyperlink may link to an intermediate web site or server, for example, which may be used for tracking or accounting, and which may then forward the user to the appropriate e-commerce site. In the example of FIG. 2, receiving user 121 selects referral link 124, which takes the user to the website 202 (or to a similar service or application). User 121 may activate the referral link 124 via any method, including for example, without limitation, a click, a tap, a verbal command, a gesture, or any other action or prompt. The referral link 124 includes URL 201 that has the address of the e-commerce site (or to another server that then forwards to this e-commerce site), along with a parameter that identifies the referring user. This URL format is illustrative; one or more embodiments may embed any desired information into a referral link in any desired format. For example, without limitation, URL 201 may encode or include any combination of one or more of an identifier that identifies the sending user, the characteristics of the content that the user input, the matching item from the database, a merchant to which the recipient is directed, the context within which the content was input, and the application that the user used to input the content.

URL 201 may be formatted in any desired manner, using any desired encoding scheme or schemes to embed the desired information. For example, the system may include within the database a set of URL formatting rules or templates which may identify the technical requirements for URLs or encoded information for each merchant, product, service, brand, promotion, intermediary or type of reference made by the user. When the system creates a link, the system may perform a lookup within the URL formatting rules to determine and execute the appropriate URL structure to successfully send the recipient to the correct site or coupon with functioning tracking and attribution. The URL may be constructed to send the recipient to a deep-link within the merchant site which corresponds with the reference made by the user and which may include, for example and without limitation, a product detail page, search result or a category page. The URL may be constructed to map the user's input to an item and merchant URL prefix so that the merchant can receive the intent of the user. For example, the user may input "strappy sandals at BigMegaStore" and the system would generate a URL with a link to the merchant site (such as www.bigmegastore.com) and a reference to "strappy sandals" within the URL, for example via a search term.

User 121 may then interact with site 202 to purchase goods or services or perform other transactions. When the user completes a transaction, for example using button 203, referral tracker 210 receives this information and credits the referring user with the successful referral. In one or more embodiments, information relating to completed transactions may be obtained from one or more third parties, including for example the merchant, an affiliate network, a credit card processor, or other system. For example, the website 202 may transmit a message to a referral tracker server with the URL 201 (so that the original referrer can be identified); this message may also include any additional details of the transaction. The referral tracker 210 may determine the amount and type of referral credit 211, based for example on the amount of the transaction and on specific arrangements with the e-commerce merchant for referrals. The referral tracker may then collect this credit from the referring merchant 212, and transmit this credit to the original referring user 101 (possibly net of a fee to the referral system provider). In one or more embodiments, the computer or server that executes referral matcher 110 may also execute or otherwise host referral tracker 210. In other embodiments, a distributed architecture may be utilized and multiple computers may implement the referral matcher 110 and referral tracker 210. Any cookie based technique or any other technique may be utilized to provide referral tracking so that for example a receiving user may use a link or otherwise purchase a product or service at a later date and still be tracked as taking an action because of the referral, so that the referral tracker may credit the referring user.

In one or more embodiments, any or all of the functions of the referral tracker 210 may be provided by third-party systems or services. For example, without limitation, these third-party systems or services may provide some or all aspects of tracking, attribution, payment processing, calculation of referral credits earned, or reconciliation.

In the example illustrated in FIG. 2, link 124 leads directly to a merchant site at URL 201. A site referred to via a link may be for example, without limitation, a website, a mobile application, a desktop application, a server, an automated communications platform, a call center, or a salesperson (for example via telephone, online chat, text communication, or any other form of communication). In one or more embodiments, a link may route through an intermediate server, which may perform functions such as for example, without limitation: determining which merchant or merchants provide the item; prioritizing which merchant site the system should direct the recipient to; identifying a promotion or coupon for a product, service, brand, or merchant; and prioritizing which merchant coupon to make available to the recipient. In one or more embodiments, when a recipient activates a link the system may generate and present to the recipient a coupon. The coupon may be for example in the form of a code, a printable document, a UPC code, a QR code, a ticket, an image, or another identifier. The recipient may use the coupon for example for offline transactions, in which the recipient transacts with a merchant (physically, verbally, or digitally) via an interaction which does not get tracked via a link to a site. The system may present the coupon in any desired format, including for example in a printable document, a virtual document, or in an audio or video format.

One or more embodiments may provide a referral credit for any type of action or event that results from a referral, including but not limited to a purchase transaction as shown in FIG. 2. For example, without limitation, a referral credit may be provided for a completed transaction by a recipient, for a recipient clicking on a link, for a recipient consuming any product or service, or for a recipient taking an action after clicking on a link, such as signing up for or joining a program or service, requesting information, enrolling, applying, registering, subscribing, or installing or downloading an application. Any type of transaction may be tracked and credited, including offline transactions that may for example include a purchase at a physical store, consumption of products or services offline (for example at a restaurant, a physical therapy site, or a live entertainment site). Transactions may include for example, without limitation, purchases, clicks, downloads, submittals, installs, sales inquiries, views, rentals, one-time purchases, recurring purchases, and subscriptions.

When a user completes a creditable transaction, a merchant associated with the transaction may owe a fee. The fee may be in any form including for example, without limitation, money, credit, points, discounts, cash-back, or membership status. The merchant (or their agent or intermediary) may remit the fee or fees to the system. The system may then remit all or a portion of the remitted fees to the user, to the recipient, or to another designee that the user or recipient may designate (such as a charity, organization, or individual). Remitting may occur via any mode, depending on the nature of the fee, and may include for example, without limitation, ACH, EFT, wire transfer, a check, a digital wallet, Bitcoin or other digital currency, crediting a credit or debit card or gift card, remittance via online payment providers such as PayPal® and Venmo®, crediting points to a loyalty program, and providing a discount code for future purchases.

Figure 3:
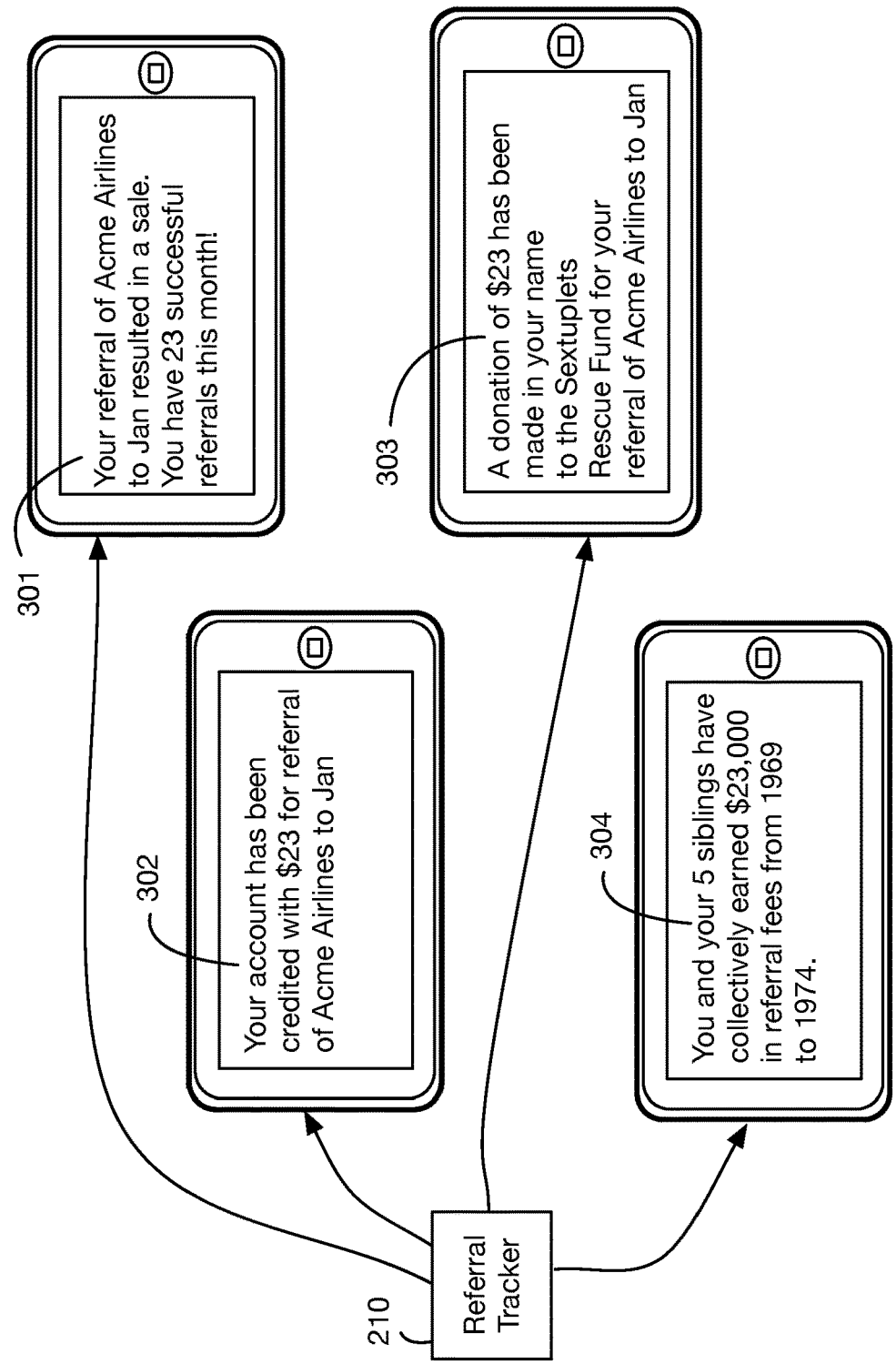
FIG. 3 shows illustrative options of the types of credits and notifications the referral system may provide to the referrer.

In one or more embodiments, a referral credit may be provided to any person, persons, groups, or organizations, including but not limited to the original referrer. A referral credit may be monetary, or it may take any other form such as an award, a gift of goods or services, a credit against previous expenditures, or a credit for future expenditures or usage. FIG. 3 illustrates several options for referral credits; these options are illustrative and are not limiting. Referral tracker 210 may issue a monetary credit 302 to the original referrer. It may generate a feedback message 301 to the referrer, which may for example inform the referrer when a referral has been used by a recipient; feedback messages may also provide the referrer with aggregate information on all activity resulting from the referrer's referrals. Feedback messages may include information such as the time of a recipient's transaction, the recipient's transaction amount, the referral fee amount earned, the rate of links sent to conversions (i.e., a quality score for a user), and a settlement status change. One or more embodiments may also provide an account profile or account summary view accessible to the referring user, such as a user dashboard, where the user may view information such as details of referrals, resulting clicks, transaction, credits, payments, products, services, or merchants referred, conversion rates for referrals, analysis and suggestions which aid in optimizing future referrals, and preference settings. A user dashboard may also provide mechanisms to control the modes in which fees are remitted or stored, such as for example by physical check, ACH, international wire, local bank transfer, cash pickup, PayPal®, Venmo®, pre-paid debit card, or gift card. Referral tracker 210 may generate a referral credit 303 in the form of a donation to an organization, for example which may or may not be made in the name of the referrer or may otherwise be associated with the referrer. In one or more embodiments referrals may be tracked on a group basis; for example, referral tracker 210 may generate aggregate referral credits 304 to a group (or on behalf of a group) based on activity resulting from referrals by any or all members of the group. In one or more embodiments, a referral credit may also be shared between a referring user and the receiving user (such as referring user 101 and receiving user 121 in FIG. 1.)

In one or more embodiments, the system may enable a user to create (or may automatically create) an interface (a "user page") that aggregates content and links that a user has input into an application via the system. The user may be able to curate the links on the user page and may be able to make the user page available or point recipients to their user page (for example via sharing of a URL or via any other digital communication). If a recipient activates a link on a user page, the link may lead to a merchant site or generate a coupon with which the recipient may transact and generate a fee for the user (as described above).

In one or more embodiments, the system may provide a merchant dashboard that may for example include settings, bidding controls, reporting, and other features that enable a merchant to manage its interactions with the system and with users of the system, and to manage promotional programs.

In one or more embodiments, the system may enable a referrer to refer a new user to use the system or to use an application into which the system is integrated. The referrer may be an individual, company, organization, application, or other entity. The tracking code or other aspect of the system may encode a user ID to enable tracking of links generated by user content, so that when a user who uses the system as the result of a referral from a referrer earns a fee, the referrer may earn a portion of such fees, and the system may automatically remit the referral fee to the referrer. Referrers who refer new users to the system may therefore earn a portion of the resulting fees generated by these new users.

Figure 4:
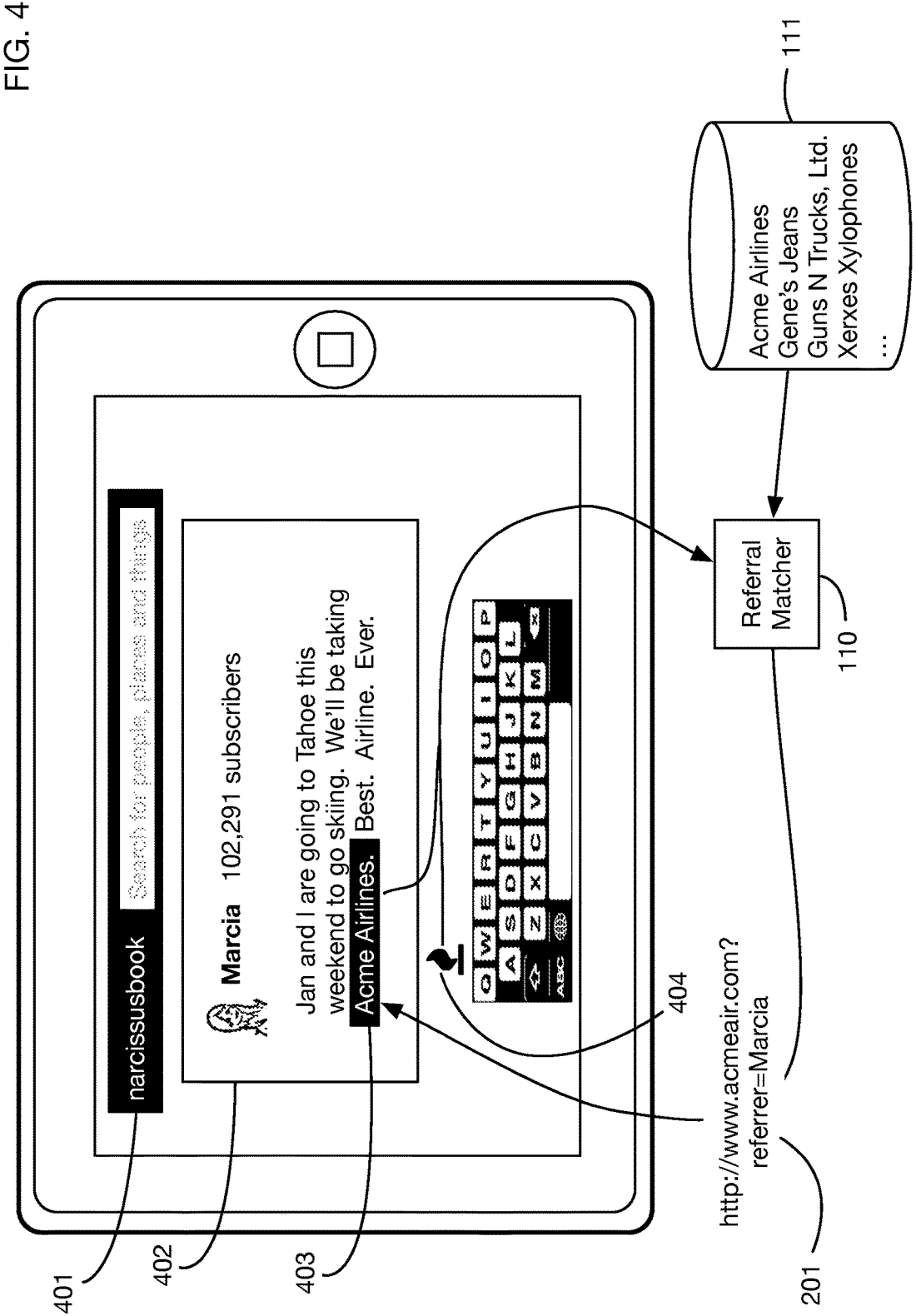
FIG. 4 illustrates an embodiment that allows a user to select text in a social media posting, and search for referrals matching the selected text.

FIG. 4 illustrates an embodiment that allows a user to select text or other items and to initiate a search for potentially matching products, services, or merchants for referrals. In this example, the user is communicating via a posting 402 on a social media site 401. Any other user who reads the posting may receive this communication, and may thereby receive and use referrals embedded in the posting. The user types the posting and selects text 403, and then initiates a search for matching referrals by pressing icon 404, which may for example be integrated into a virtual keyboard or otherwise made available to the application used for creating or reviewing the posting. The referral matcher 110 matches the selected text 403 to the merchant database 111, and generates a referral link 201 that is inserted into the posting 402. The display name of the referral link may remain the same, such as remaining the selected text 403; one or more embodiments may modify the display name of the referral link in any desired manner, for example as necessary to comply with policies or technical requirements of the communications channel being used. In one or more embodiments, a user may be able to select and match any information, including for example, without limitation, text, documents, files, web pages, URLs, images, or message threads, and may be able to initiate a search by the referral matcher against any of this information.

In one or more embodiments, the referral matcher may perform a search for matches continuously in the background, and it may display the results of these background searches when the user explicitly indicates that he or she wants to see the matches. For example, the user may tap an icon such as icon 404 in FIG. 4 in order to see matching referrals. Referral matches may be determined based on user selected text (as shown in FIG. 4), or based on automatically detected relevant content (as shown in FIG. 1), or on any combination thereof. In an "auto mode," matching referrals may be shown to the user automatically as they are located, as shown in FIG. 1. In a "manual mode," matching referrals may be shown on request. In one or more embodiments, a user may be able to view multiple matching referrals on request, for example by successively tapping on an icon to see the next match in the list. As an illustration, for message 402 in FIG. 4, if the system is in manual mode, a first tap on icon 404 may present a suggestion of Acme Airlines, while a second tap on icon 404 may present a suggestion of a hotel in Tahoe.

Figure 5:
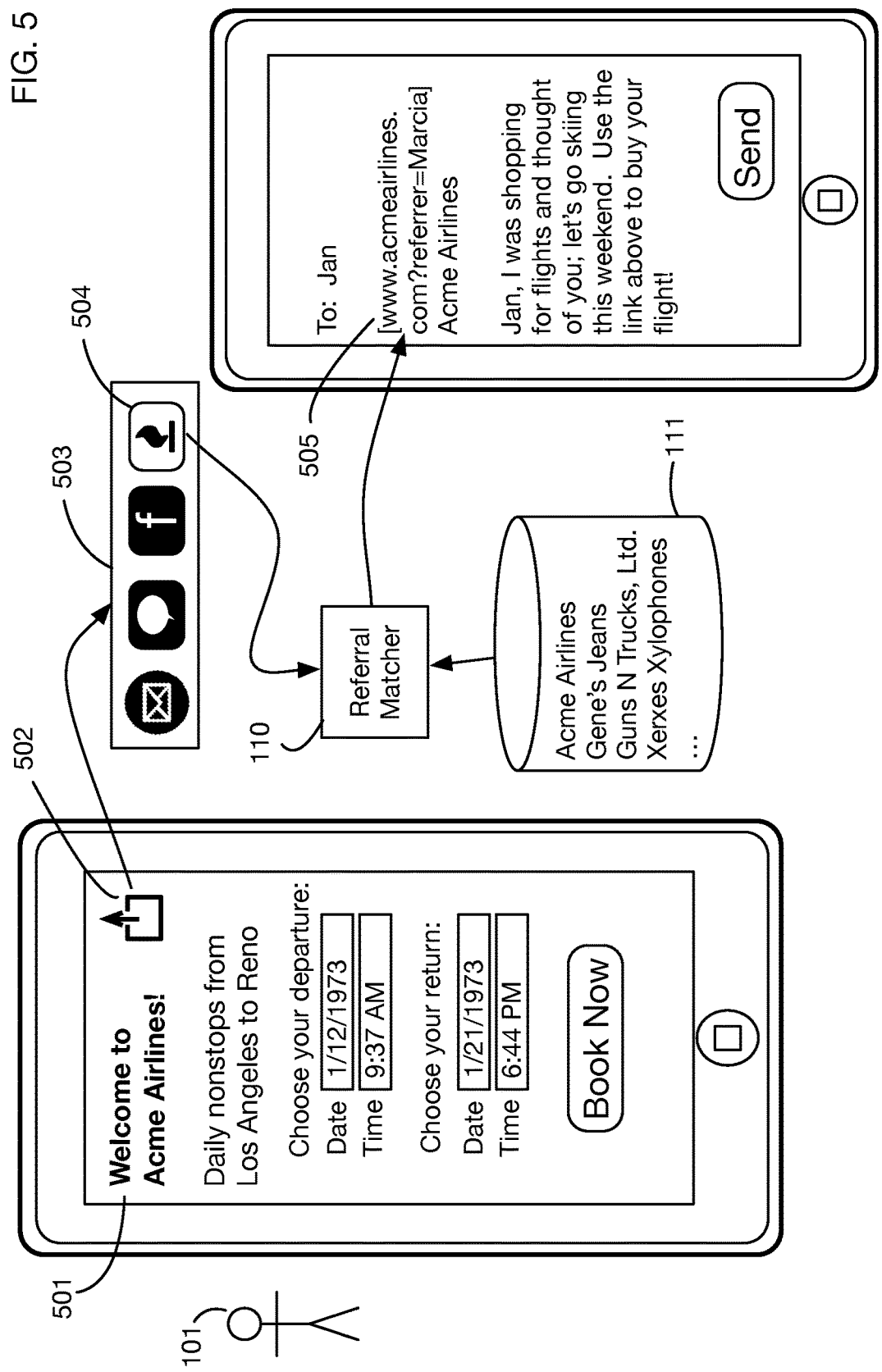
FIG. 5 illustrates an embodiment that generates a referral using a share button.

FIG. 5 illustrates an embodiment that allows a user to generate a referral link using a share button or a similar sharing capability. User 101 is browsing website 501, for example while making or planning a purchase. The user decides to share the website, and possibly also share specifics of the user's browsing (such as potential purchases), by pressing the share button 502. This share button may for example present a sharing menu 503 to the user, which offers multiple ways to share the current context. In one or more embodiments, the system may provide a referral sharing option 504 as an option in this sharing menu. When the user presses the referral button 504, the referral matcher 110 may examine the current context that is being shared, and may determine whether any items from database 111 match this context. If a match is found, it may for example be inserted as a referral link 505 into a message, which the user may then complete and send to any desired recipient or recipients. In one or more embodiments, matching of the context to potential referrals and generation of referral links may be combined with sharing via any other method, such as via a text, email, messaging app, or a social media site.

In one or more embodiments, sharing of a website URL or other information may be done first via a sharing button, and then the option to convert this link to a referral link may be presented in the messaging application that shares the link. For example, if user 101 selects the email icon from sharing menu 503, an email application may appear allowing the user to compose a message with the link to site 501. In this email application, the user may have an option to convert this website link to a referral link, for example by pressing a referral icon such as icon 504 that may appear in the email application, or, in the event that the application launches a virtual keyboard, by pressing a keyboard icon.

In one or more embodiments, sharing of a referral related to a website may be performed directly using a button or icon that generates a referral link to that website, or to a similar site related to the website. For example, without limitation, any website may incorporate a "refer" button or icon. When a user presses or otherwise accesses this button or icon, a referral link may be created for a merchant related to the website, where the referral link also identifies the user making the referral. This referral button or icon may be analogous for example to a Pinterest™ pin button, but instead of "pinning" a link to the website, the referral button or icon generates a referral link to the website that will generate a referral credit to the referring user when and if another user accesses the referral link and completes a transaction.

Figure 6:
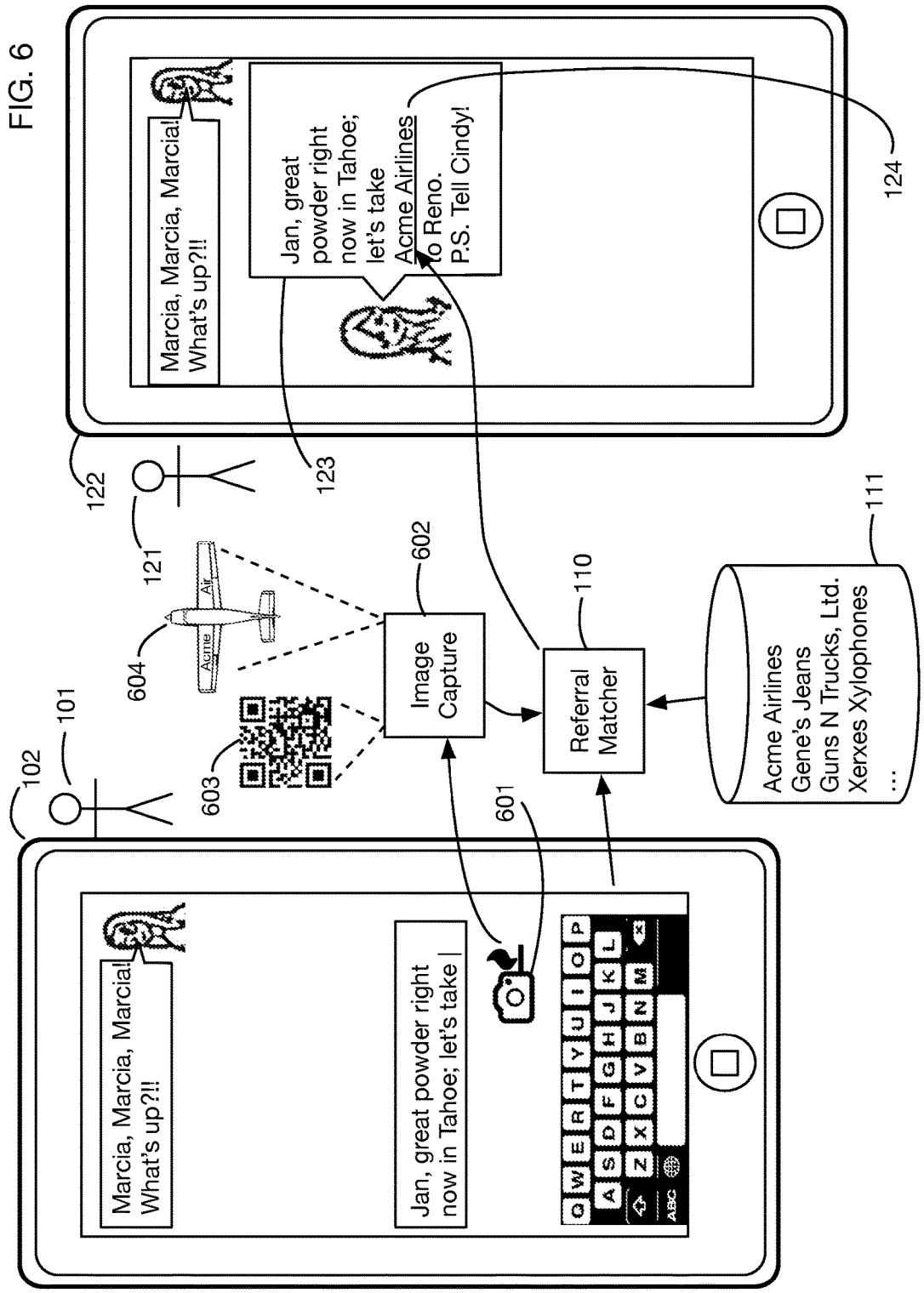
FIG. 6 illustrates an embodiment that matches an image captured by a camera (such as a barcode or an image of a product) and that generates a referral based on this image.

FIG. 6 illustrates an embodiment that supports input of an image into a referral matching process. The system may match any image or any data derived from an image with the items in a merchant database to obtain potential referrals that match the image. The image may be for example, without limitation, a barcode (either a 1D barcode or a 2D barcode such as a QR code), an image containing a product name or product identifier, a picture of a product, or one or more frames from a video containing a product. In the example shown in FIG. 6, user 101 uses mobile device 102 to compose a message to a recipient. The user wants to insert a referral link to a product, and therefore presses image capture button 601 to initiate image capture 602, for example via a camera integrated into device 102 or accessible via device 102. This image may be for example, without limitation, a QR code 603 that identifies the product, service, or merchant being referred, or a picture 604 of the product, service, or merchant. The image capture 602 provides the captured image or images to the referral matcher 110, which compares the captured image or images to information in the merchant database 111. Comparison and matching of images may in one or more embodiments use external databases or services, such as for example a lookup service for barcodes or an external database of product images. If a match is located, the referral matcher may generate a referral link 124 and insert this link into the message 123 transmitted to the message recipient 121. In one or more embodiments, a barcode or QR code application may execute on electronic device 102 and the information obtained from the barcode or QR code may be utilized to index into database 111 to determine a corresponding merchant. In other embodiments, any image processing based application that can recognize objects may be utilized to determine a product or product category that is utilized to search database 111 for.

In one or more embodiments of the invention, any type of input may be provided to the referral matcher, including but not limited to text input and image input. For example, without limitation, input into the referral matcher may include sounds of any type or voice commands, and the referral matcher may for example use voice recognition or any type of audio processing to recognize the input and compare it to items in the merchant database. Input may also include data captured by any type of sensor, scanner, or reader. For example, one or more embodiments may allow a user to use an RFID reader to read an RFID tag that identifies a potential referral.

Figure 7:
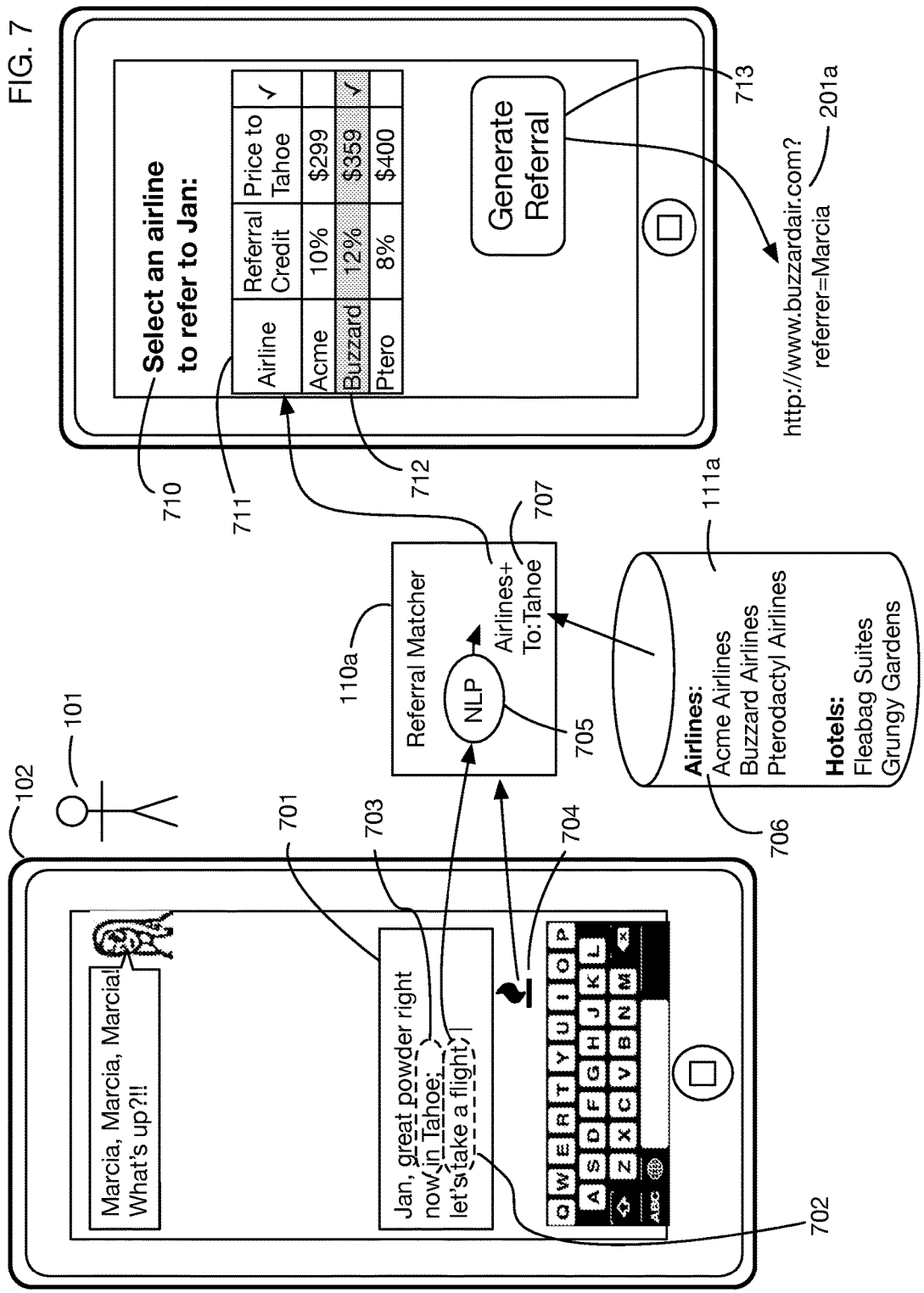
FIG. 7 illustrates an embodiment that uses natural language processing to identify words in a communication that may infer or otherwise match one or more merchants, and that presents a choice of matching merchants to the user.

In one or more embodiments, the referral matcher may use language processing and analysis techniques to understand the user's input and to determine matching merchants. These techniques may include for example, without limitation, artificial intelligence, natural language processing, collaborative filtering, type-ahead, predictive analytics, machine learning, recommendation engine, personalization engine, or any combinations thereof. FIG. 7 illustrates an embodiment where the referral matcher 110a has a natural language processor (NLP) 705 integrated into or accessible to the referral matcher. The user's input 701 is provided to the natural language processor 705, either automatically as the user types or in response to the user pressing a referral button such as 704. In this illustrative example, the NLP subsystem 705 recognizes the phrase 702 as relating to airline travel, and therefore searches the merchant database 111a for airlines. FIG. 7 also illustrates that in one or more embodiments the merchant database may be categorized, indexed, or organized in any desired manner to facilitate referral matching; for example, database 111a has airline merchants 706 identified as a particular product group. In this example, the natural language processor also detects that phrase 703 in the user's input 701 indicates the user's likely destination for air travel. Therefore, the NLP subsystem 705 determines that the user is discussing context 707, which includes both the product category (airlines) and the likely destination. All contextual information from analysis of the user's input may be used to select one or more matching referrals. Virtual keyboard 104 may be utilized with the microphone instead of directly manually typing as per FIG. 1 and also FIG. 7 for example.

Continuing the example shown in FIG. 7, in this case the referral matcher 110a determines that there are multiple possible merchants that match the user's input. When multiple merchants match the input, the system may either automatically make a selection of a merchant to refer, or it may ask the user to make a selection. (One or more embodiments may use combinations of these methods.) FIG. 7 illustrates an embodiment that asks the user to select which merchant to refer. Once the referral matcher has determined matching merchants, the system presents screen 710 to the user and asks the user to select one of the matching merchants. (This screen 710 is illustrative; one or more embodiments may present matching options to a user in any desired format and sequence.) In one or more embodiments, the referral matcher may provide additional information to assist in making the selection. For example, in FIG. 7 the selection screen 710 contains table 711 that shows the matching merchants along with the referral credits offered by each merchant. Table 711 also shows the price from each merchant for travel to the destination 707 determined by NLP subsystem 705. This example illustrates how the complete context 707 determined by the NLP subsystem may be used to determine an appropriate or potential referral, or to assist the user in making a selection from multiple matches. The user may select a particular merchant from table 711 and generate a referral link 201a using button 713. Other user interface options may include for example tapping a selected merchant in the table to generate a referral to that merchant, or tapping a button or icon to prompt the matcher to prompt the matcher to display a list of alternate matching merchants, or in some cases alternative product categories when the input has matches in multiple categories (such as a book title that has also been made into a movie and a board game).

Although FIG. 7 illustrates an example where the user makes a selection of a referral, in one or more embodiments the system may automatically select a referral based for example on the referral credit, the price of the product or service offered, or on any other factors. One or more embodiments may include a bidding system whereby merchants bid for referrals, for example by offering referral credit rates or other rewards. In one or more embodiments, the bidding system may be dynamic, in that referral credit information may be obtained for each transaction, for example whenever a referral matcher or a user is making a selection among merchants to generate a referral.

One or more embodiments may include a merchant bidding system through which participating merchants may compete with other participating merchants to be positioned higher in the prioritization of referrals. A merchant may include, without limitation, a retailer, e-commerce provider, service provider, advertiser, aggregator, broker, agency, promoter, or a party acting on their own behalf or on behalf of another party. Any of the following techniques may be utilized. Embodiments of the system may provide merchants with a self-service system for placing bids. Merchants may bid on a variety of matching characteristics including, without limitation, brand, product, service, keyword, phrase, product category, SKU or other product coding. Merchants may bid based on bidding strategies including, without limitation, referral fee percentage, fixed amount of reward, bounty for leads, price per click, bounty for installation of application or software, or another action performed by a recipient who has utilized a referral link to the merchant. Embodiments of the system may include a bidding platform that may provide the merchant with multiple modes of bidding including, without limitation, manual mode (with which, for example, merchant sets a specific bid price for a specific product referral) or automatic mode (with which, for example, merchant designates a daily budget and time period and the system adjusts the referral fee bid automatically to deliver the most referrals possible within the merchant's designated budget and time period). The merchant may specify bid pricing or referral limits based upon specific characteristics of the sender or recipient(s) including, without limitation, the sender or recipient's geography or, demographics, sender or recipient transaction history, input type used by sender, device type used by sender or recipient, communication channel through which the referral link was sent, or any combination thereof. The merchant may set limits on bids placed and may set time period for which the limits apply. Limits may include (without limitation) maximum amount of referral credits paid (for example a daily budget), maximum number of referrals received or other limits. Embodiments of the system may enable the merchant to set dynamically priced bids, such that the bid amount adjusts, which may be automatic, depending upon factors such as, without limitation, time of day, level of demand, inventory availability, climate changes, competitive pricing dynamics relating to other merchants, specificity or other characteristic of the sender's input which generated the referral, number or rate of referrals already received or paid by the merchant, or other characteristics of sender or recipient such as any of those mentioned above (e.g., geography, user demographics, communication channel utilized, etc.). Embodiments of the system may provide merchants with a dashboard which may provide, without limitation, account settings, preference settings, payment setting, reporting, data and analysis, bidding controls, account management services and communication tools. Embodiments of the system may implement any of these techniques for example at least at FIG. 11, step 1112.

Figure 8:
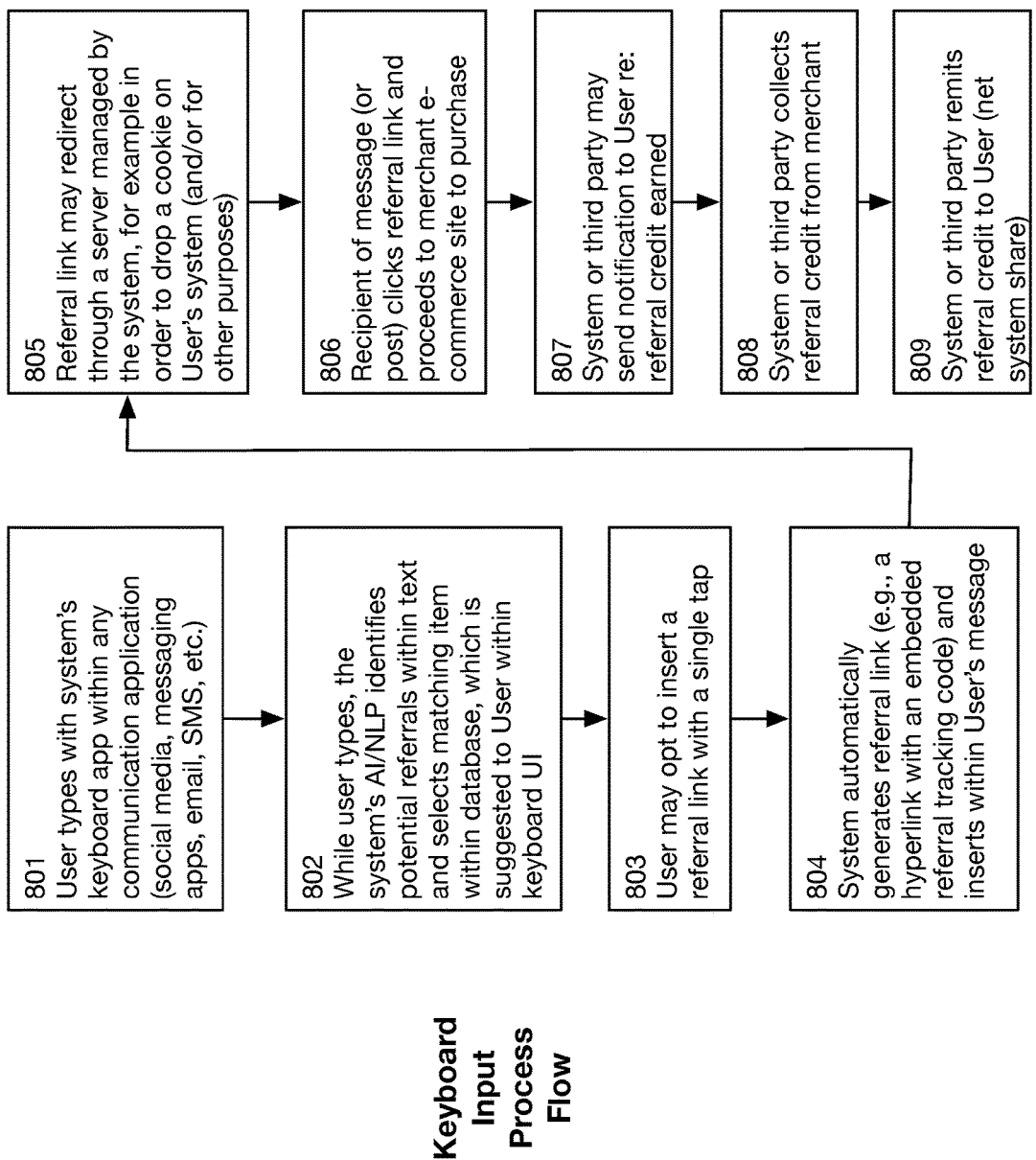
FIG. 8 shows an illustrative process flow for an embodiment of a peer-to-peer trackable referral system, where the input used for the referral lookup is obtained from a keyboard.

FIG. 8 shows an illustrative process flow for selected steps in the referral process, for a scenario and embodiment in which input is obtained from the user via a keyboard. These steps are illustrative; one or more embodiments may execute different steps, additional steps, or may execute any of the steps shown in FIG. 8 in a different order or in parallel. In step 801, the system accepts input as the user provides the input via keystrokes using a virtual keyboard connected to a communications app. In one or more embodiments, the virtual keyboard may contain or be linked to a referral matcher for example over any type of local or remote communications channel; this referral-aware keyboard may for example be usable with any application that accepts keyboard input, (which again may include spoken words via the microphone). By integrating the referral matcher with the keyboard, one or more embodiments enables universal general-purpose referral generation capability for any communication initiated by the user.

In step 802, the referral matcher may use artificial intelligence, natural language processing, or similar techniques to parse and understand the user's input. It may then select a matching item in the database, and suggest this referral to the user. A matching item may be any type of information for which a referral or recommendation may be relevant, including for example, without limitation, a product, a service, a brand, a merchant, an activity, an instruction, a suggestion, a solution, an information source, a person, and organization, a professional, or any combination thereof. The suggestion may be integrated into the keyboard app, for example as a suggested word completion. At step 803, the system may accept input from the user that may then tap on the suggested referral to accept it, which triggers step 804 that creates and inserts a referral link into the communication. The referral link may for example contain a hyperlink to a merchant (or to an intermediary), along with a tracking code that identifies the referring user.

Once the message containing the referral link is transmitted to the recipient, the system may execute additional steps such as steps 805 through 809, for example when and if the recipient uses the referral link to access a merchant site or to make a purchase. In step 805, if the recipient access the referral link, the link may in one or more embodiments initially pass through an intermediate server, prior to redirecting the recipient to the merchant's site. This server may for example track the referral, and it may place tracking information such as cookies on the recipient's device. A cookie may for example have a duration that last for multiple days, thereby providing credit to the referrer if the recipient transacts at another time other than the initial click of the link. The cookie may also provide credit if the recipient subsequently goes directly to the merchant site without using the referral link. In cases where the recipient's device does not accept cookies (many mobile phones do not), one or more embodiments may use other techniques such as device UID and IP address to associate a recipient's subsequent transactions with the original referral link. In one or more embodiments, the referral link may lead the recipient to a site or user interface control that may link to one or more merchants, rather than to an intermediate server that automatically forwards to a merchant site. For example, without limitation, the referral link may lead the recipient to a jump page, an interstitial web page, a pop-up, or an overlay. This link destination may show a range of information related to the referral link, including for example product descriptions, product or merchant locations, a list of matching merchants from which the recipient can select, images, videos, or any other information related to the referral.

In step 806, the system accepts input from the recipient who proceeds to the merchant's site using the referral link. If the recipient makes a purchase or other transaction on this site, the system's referral tracker records the transaction. In step 807, a notification may be sent to the referring user by the system. In step 808, the referral tracker collects a referral credit from the merchant, which is then remitted in step 809 to the referring user. In one or more embodiments, some or all of the steps of tracking, attribution, collection, and payment may be performed by third-party services or systems.

Figure 8A:
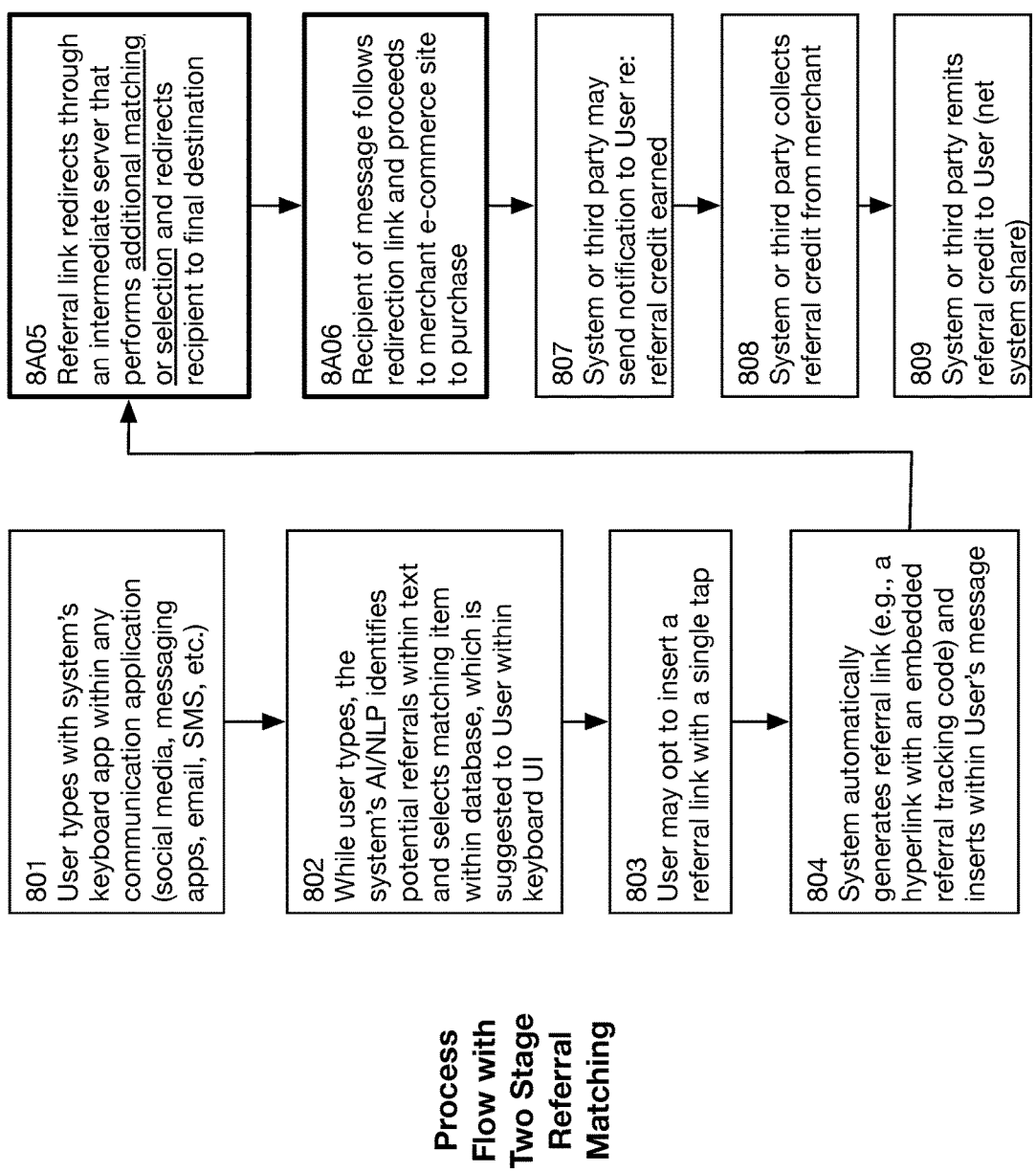
FIG. 8A shows a variation of the process flow of FIG. 8, where a referral link directs a recipient to an intermediate server that makes a final selection of a referral destination, and redirects the recipient to that destination.

In one or more embodiments, determining a destination (such as an e-commerce site or a product page) for a referral may be performed in two (or more) stages. FIG. 8A shows an illustrative process flow for an embodiment that uses two-stage matching to direct a recipient to a referral destination. Initially in step 802, as in FIG. 8, the referral matcher determines a match for the user's input, and in step 804 the system generates a link with the match information. However, in one or more embodiments the initial match in step 802 may not identify a final referral destination, but may instead identify only general information such as the existence of a matching product, service, or merchant, or a general category or group of products, services, or merchants that may match the user's input. For example, the initial referral matching step may identify that a user communication mentions a flight, but it may not identify a particular airline to fulfill this flight. In these situations, the initial referral link generated in step 804 may direct the recipient to an intermediate server that performs additional processing and matching in step 8A05 to select a final destination for the referral; the intermediate server may then redirect the recipient of the referral link to this final destination. When the recipient is redirected, the recipient arrives in step 8A06 at a final referral destination (such as an e-commerce site), where the recipient can perform actions that result in a referral credit to the referring user (as described above with respect to FIG. 8). The final destination may be for example, without limitation, a web site, web page, application, URL, URI, web service, or more generally any physical or virtual destination or service that completes the referral.

A potential benefit of the process flow illustrated in FIG. 8A is that the initial referral matching step 802 can be relatively "lightweight" and may for example require only a relatively small database of products, services, and merchants. Moreover, this database for the initial matching may not need to be updated in real time to reflect dynamic information that may determine the best match for a referral. Because the final matching stage 8A05 is performed on the intermediate server, it can access a more complete and up-to-date database of information, including for example dynamically updated bids from merchants on referrals. It may also access more powerful computing resources to execute computationally intensive algorithms. The intermediate server can use any desired strategy or prioritization algorithms to determine which merchant to send a recipient to. For example, without limitation, the intermediate server may rank merchants by any or all of price, availability, user ratings or reviews, level of inventory, proximity to a user, speed of fulfillment, or size of referral credit offered to the referring user.

FIG. 8A illustrates a two-stage referral matching process flow. One or more embodiments may generalize this process to perform referral matching in any desired number of stages, using any desired number of servers and databases to process information and determine a final destination associated with a referral link.

Figure 9:
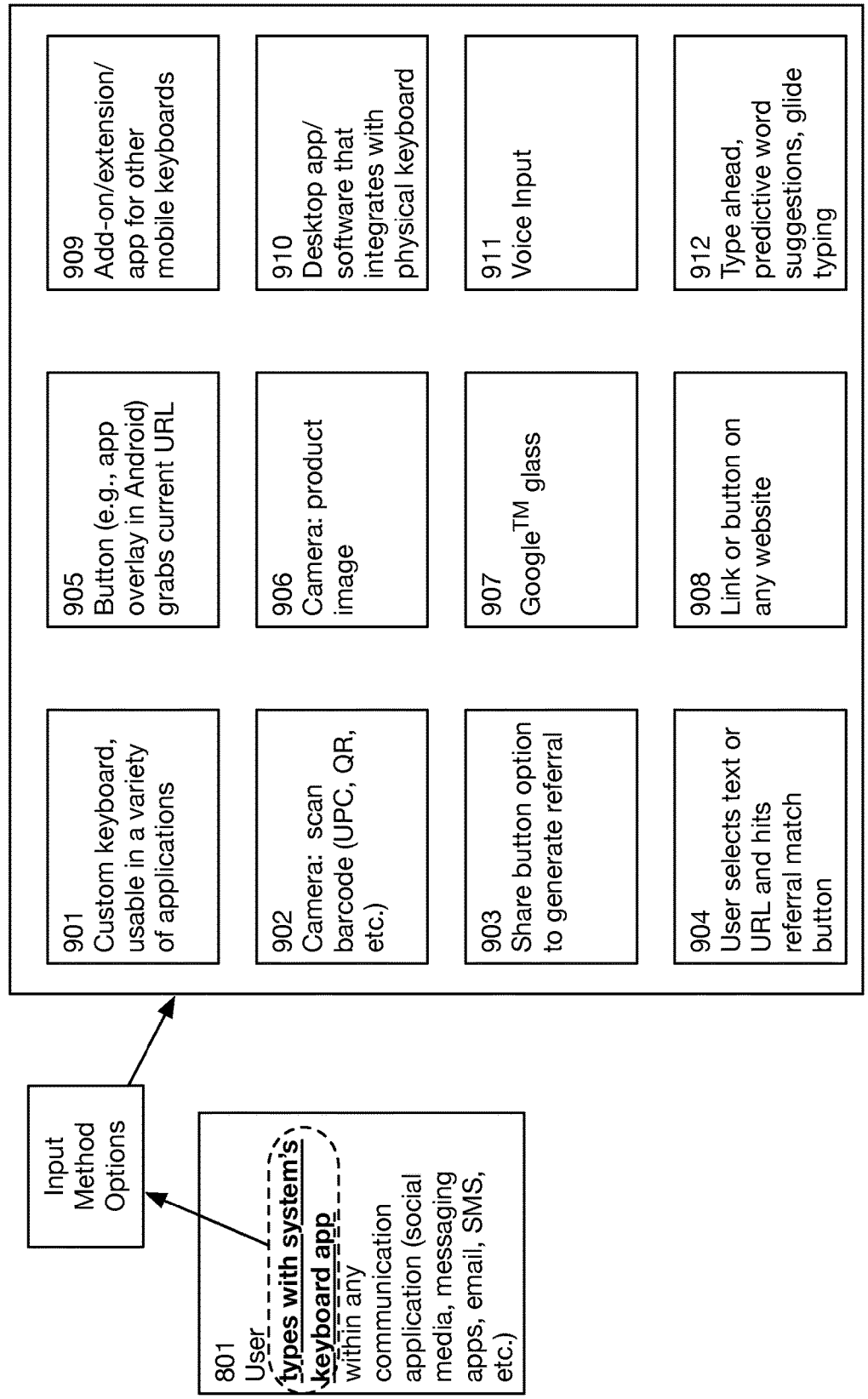
FIG. 9 shows illustrative alternative embodiments for obtaining input that may be used to generate a referral.

The process flow shown in FIG. 8 uses keyboard input as illustrative input into the referral process. As described above, other forms of input may be accepted by one or more embodiments. FIG. 9 illustrates several other input method options that may be supported by one or more embodiments of the referral system. In addition to keyboard input option 901 (as shown in FIG. 8), input may be obtained from a camera scanning any type of code, e.g., barcode 902, from a share button option 903, from a user selection of text or a URL 904, from a button 905 that grabs a current URL, from a camera scanning a product image 906, from images or audio obtained from Google™ glasses 907, from a link or button placed on any website 908, from add-ons or extensions for other keyboards 909, from an application that integrates with a physical keyboard 910, from voice input 911, or from type ahead, predictive word suggestions, or glide typing applications 912. These input methods are illustrative; one or more embodiments may obtain input of any type, in any format, from any device, service, subsystem, or application.

As a first illustrative example, which corresponds to keyboard input option 901, the system may be integrated into a mobile device virtual or soft keyboard input method or service. The system may monitor input content from this soft keyboard and interpret through analysis when the user has referenced an item. When the user completes the input of a reference to an item (or to an entire communication with references in it), the system can offer to optimize the user's communication before it is sent. The system may do this automatically or at the user's specific request.

As a second illustrative example, which corresponds to voice input option 911, the system may be integrated into a mobile device or a smart speaker application. The system may for example monitor words as the user speaks them and perform analysis of the content to identify references to items. Before the user sends the communication, the user may have the system optimize the communication. This optimization may be done automatically or upon the user's explicit request. When the system optimizes the communication, it augments the communication such that the reference to an item includes characteristics that include tracking and attribution (such as the user ID and the item in the database).

As a third illustrative example, which corresponds to camera input option 906, the system may be integrated into a camera within a mobile device. When a user uses a mobile device camera the system may analyze the image in order to determine whether the image matches an item in the database. If the image matches an item in the database, the system may prompt the user to share the image in a digital communication and the system may transform or augment the image to include a link or to make the image clickable (with a link embedded therein), either automatically or with a prompt from the user.

In one or more embodiments, a referral matcher or any related module of the system may analyze any type of existing content or new content that is input by a user into any application, in order to monetize a communication between the user and one or more recipients. The referral matcher may be built into an application or may connect to any application via any technical interface, such as for example, without limitation, a local SDK, a remote API, a set of user interface components, or a back-end system to integrate any other interface or interfaces. An application to which the system connects may be any software, system, device, application, or technology that enables a user to input content or to share content with a recipient. Applications may for example provide communications via any digital platform, such as, without limitation, peer-to-peer communications, social media, services, messaging applications, e-commerce services, digital media, digital content, images, videos, audio, product reviews, chat rooms, or published content. Applications may incorporate or integrate with devices or services such as for example, without limitation, a physical keyboard, a virtual keyboard, a mobile device or application or software, an image capture device or software, an audio/video capture device or software, a kiosk, a scanner, an RFID reader, a microphone, a vehicle, a smart speaker, smart glasses, an augmented reality device or software, a virtual reality device or software, an automated personal assistant, a smartphone, a computer, a server, a tablet, a notebook, a laptop, and any software or hardware embedded within any such device or service or subsystem.

Content accepted by, analyzed by, or transformed by the system may include content of any type or types, in any format of formats, including for example, without limitation, text, data, code, information, images, voice, video, and RFID.

A user providing input to the system may be for example, without limitation, any individual, content creator, group, company, organization, system, subsystem, bot, app, application, server, or service. The system may assign a unique user ID to each user. A user may interact directly with the system or may interact (either knowingly or unknowingly) via an integration of the system into an application that the user is using, or via a plug-in for an application or service that the user uses. A recipient may be for example, without limitation, one or more individuals, companies, organizations, or entities that hear, view, read or otherwise receive the content that is input by a user or one or more links generated by the system. In one or more embodiments, a user and a recipient may be the same individual or entity.

In one or more embodiments, the system may analyze the content of a communication using any desired methods or technologies, including for example, without limitation, natural language processing, artificial intelligence, or image recognition. This analysis may for example determine explicit references to items in the database, or implicit intent or context from which items in the database may be inferred.

As an alternative to the input method options illustrated in FIG. 9, which may for example connect the referral matcher locally with a communications application, one or more embodiments may allow a user to "fetch" a link from a remote service. For example, a user may create content and send this content to a remote service, via for example a text, email, in-app communication, Facebook® post, or instant message. The system may provide or integrate with this remote service, and may analyze the content received to identify matches to items. The system may then convert matching content to links and insert the reformatted content with these links directly into a digital communication as specified by the user or the system may send the reformatted content with these links back to the user. The user may then insert the reformatted content including the links into digital communications. For example, as a variation of the scenario illustrated in FIG. 7, a user may create a message with the content "Flight to Tahoe" and send it (via email for example) to a remote matching service. The matching service may then generate the link 201 (in FIG. 7) and insert the link into a digital communication or send the link back to the user, who can then insert the link into any desired message. When a recipient receives the link, it functions similarly to links generated via virtual keyboards or other input methods.

Figure 10:
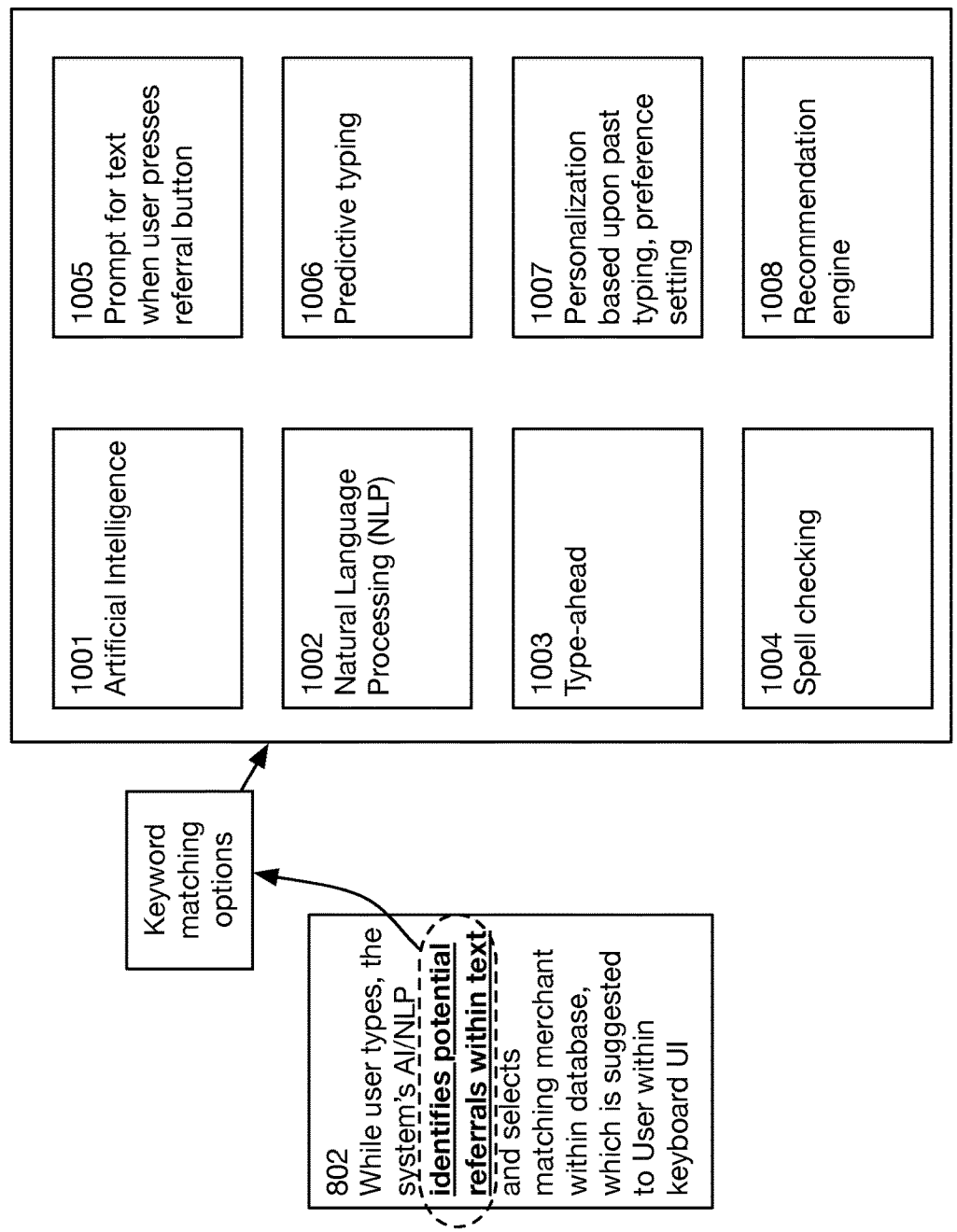
FIG. 10 shows illustrative alternative embodiments for identifying potential referrals.

FIG. 10 shows illustrative options for keyword matching or similar functionality that may be used to identify potential referrals within the user's text input or other input. Matching options may include for example artificial intelligence 1001, natural language processing 1002, type-ahead 1003, spell-checking 1004, prompts for text when the user presses a referral button or icon 1005, predictive typing 1006, personalization based on past typing or preferences 1007, and processing using a recommendation engine 1008. Additional options may include for example, without limitation, collaborative filtering, affect analysis, predictive analytics, and machine learning.

When multiple potential matches or referrals are identified, one or more embodiments may employ business strategies and algorithms to prioritize among the alternatives, thereby determining which merchant, merchant site, or coupon to present to the recipient. This prioritization may for example analyze any factor or factors, such as for example, without limitation: sender characteristics, such as the sender's item preferences (either explicitly provided or implicitly derived) and the sender's message intent or sentiment (determined for example via NLP or hashtag analysis); recipient characteristics, such as the local time zone, location, and previous behavior including item preferences (explicitly provided or implicitly derived); item characteristics, such as price, availability, discount amount, brand reputation, and product delivery speed; merchant characteristics, such as conversion rate, payout amount, and reputation analysis; and bidding platform characteristics, such as payout amount and settlement period.

Figure 11:
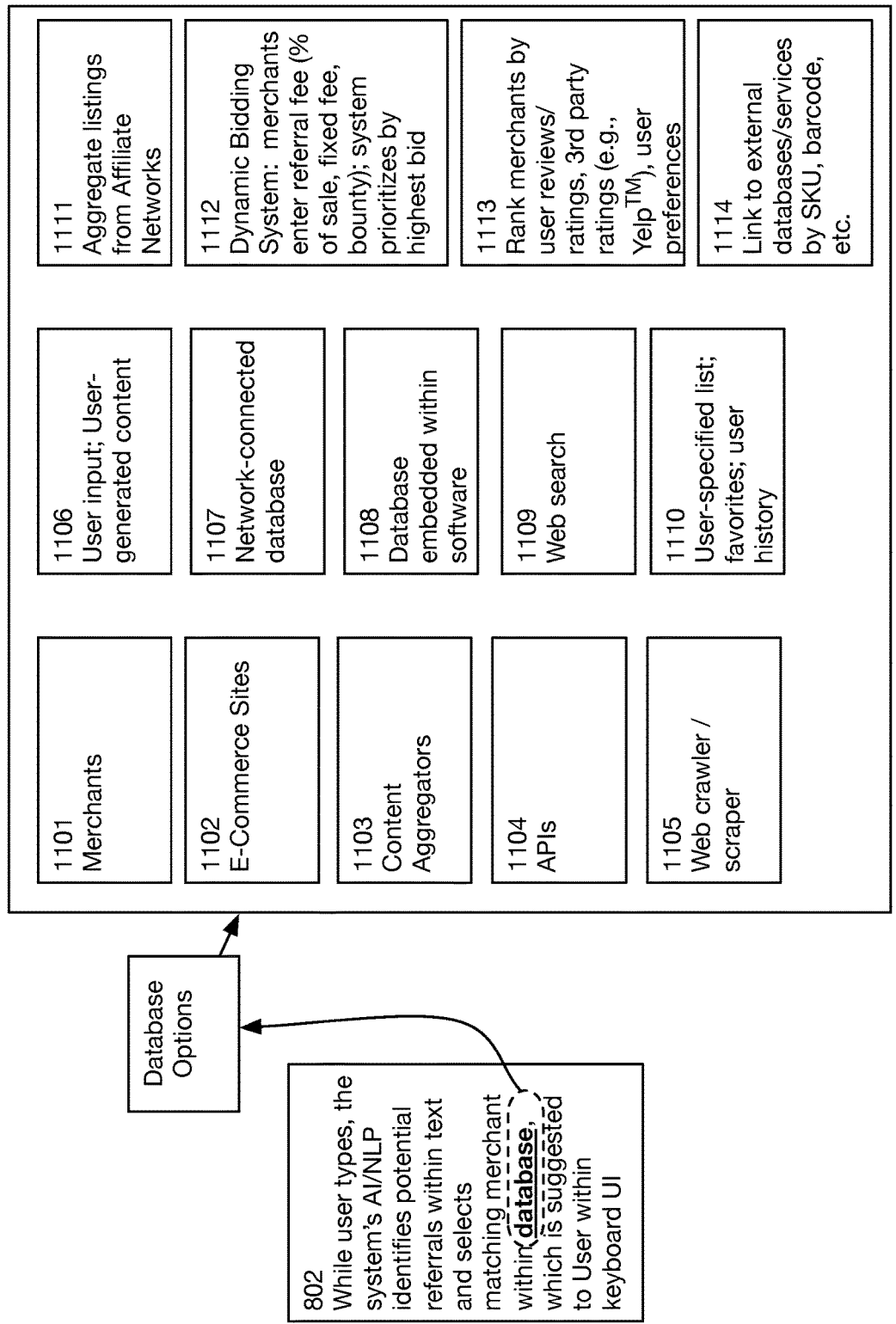
FIG. 11 shows illustrative alternative embodiments for information sources that may be used for a database of merchants for potential referrals.

FIG. 11 shows illustrative options for data sources that may provide data for a merchant database. A merchant database may contain information on merchants and on any products or services offered by merchants or by any sellers. The system may aggregate items into the database using any of several methods, including for example, without limitation, automated fetching of content made available by merchants or other intermediaries, manual input by system administrators or users, direct self-service input by merchants, input via a bidding platform, automatic creation of new items obtained by scanning and analyzing user input, and dynamic search of the web or other databases for matching items or brands that are not currently in the database. Data may be obtained directly from merchants 1101 and e-commerce sites 1102, or indirectly from content aggregators 1103. Content retrieved from merchants or intermediaries may include for example, without limitation, product catalogs, SKUs, image files, merchant affiliations with networks or other intermediaries, promotion units (including banner ads) for merchants or specific products, and URLs with deep-links to product detail pages for example. Data may be obtained via APIs 1104 or by using web crawlers/scrapers 1105. Data may be obtained from user-input and user-generated content 1106, from a user-specified list, user favorites, or user history 1110. Databases may be network-connected 1107, embedded within the software 1108, or reachable via web search 1109. Data may be obtained from aggregate listings from affiliate networks 1111. Data may be obtained from a dynamic bidding system 1112, where merchants for example may bid by specifying a referral fee. Data in the database may be ranked in any desired manner, for example by user reviews/ratings, third party ratings, or user preferences 1113. Data may be obtained from external databases or services indexed for example by SKUs, barcodes, or any other identifier of a product, service, or merchant. The system may use artificial intelligence or other methods to identify, within user input, content such as keywords, terms describing items, or new products and services; the system may then automatically (or via a prompt to a system administrator) create items in the database that match the newly identified items. These examples are illustrative; one or more embodiments may obtain data on merchants, products, services, referral fees, merchant locations, the availability of inventory, ratings or reviews related to merchants, products, or services, prices, or any attributes of these items from any desired data source, in any desired format.

Figure 12:
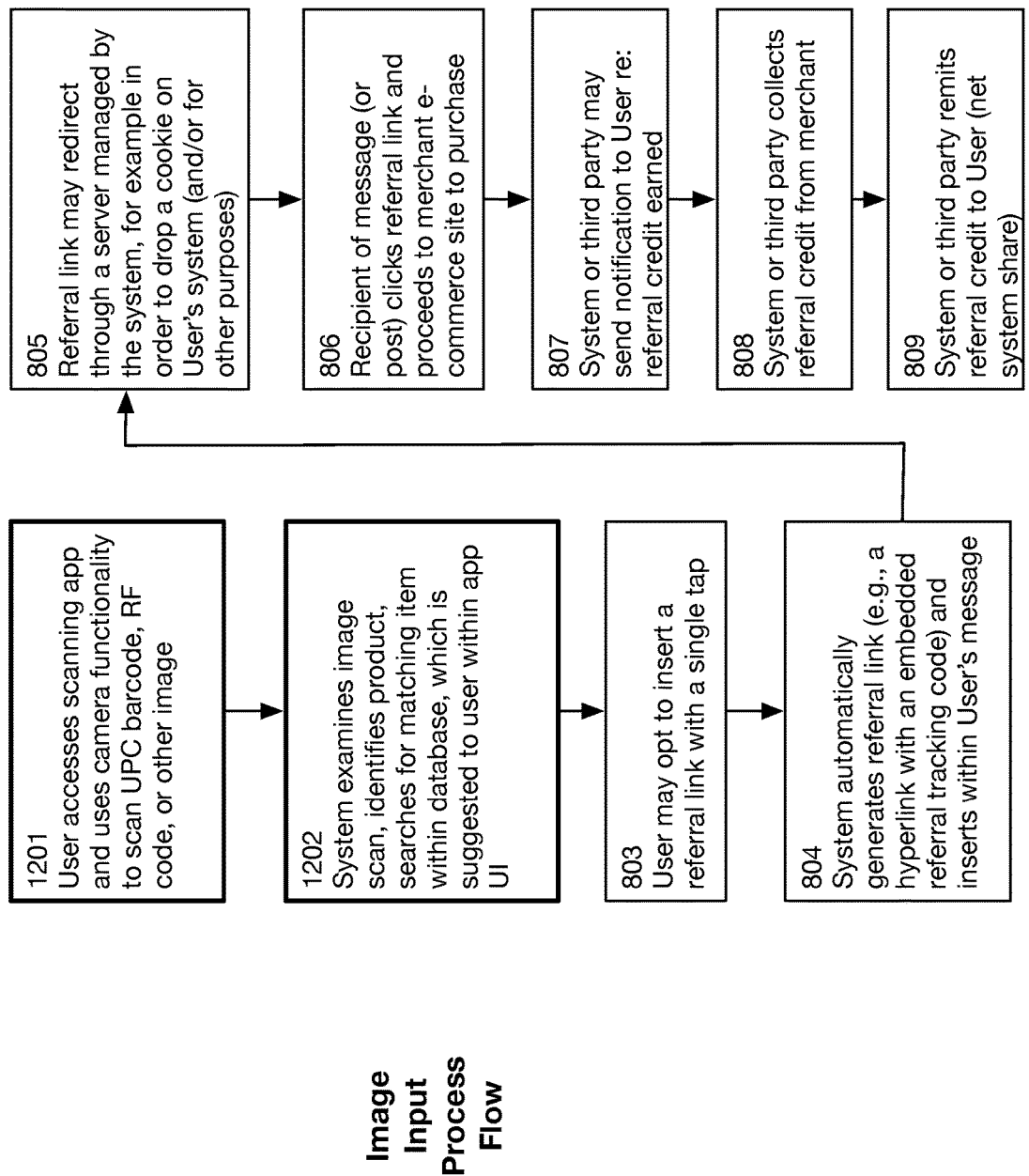
FIG. 12 shows a variation of the process flow of FIG. 8, where input for a referral is received from an image instead of from a keyboard.

FIG. 12 illustrates a variation of the flowchart of FIG. 8, where input is obtained from an image rather than from a keyboard. In step 1201, the user captures an image such as a barcode, QR code, or a product image, for example using a camera integrated into or reachable via a user's device, or by selecting a previously captured or otherwise accessible image on the user's device or accessible via a network connection. In step 1202, the referral matcher analyzes the image to determine which products, services, or merchants match the image, and it may suggest this referral to the user. The remaining steps in this process flow may be similar to those described with respect to FIG. 8.

Figure 13:
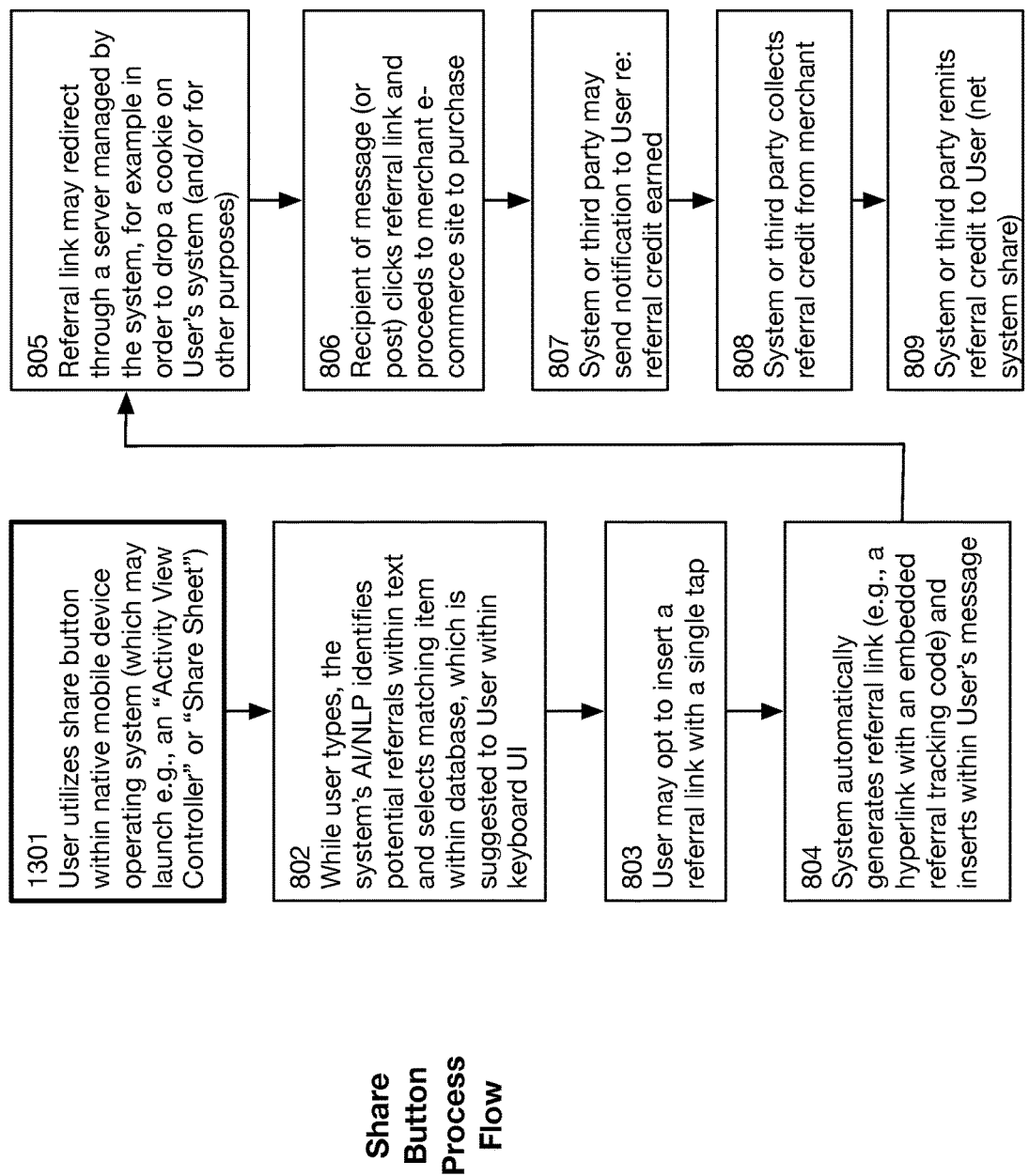
FIG. 13 shows a variation of the process flow of FIG. 8, where a referral is initiated via a share button.

FIG. 13 illustrates a variation of the flowchart of FIG. 8, where input is obtained via a share button instead of or in addition to from a keyboard. In step 1301, the user uses a share button to share an item; the share button may for example launch a "share sheet" with sharing options that depend on the item being shared. The shared content is then analyzed in step 802, and additional steps in the process flow may be similar to those described with respect to FIG. 8.

Figure 14:
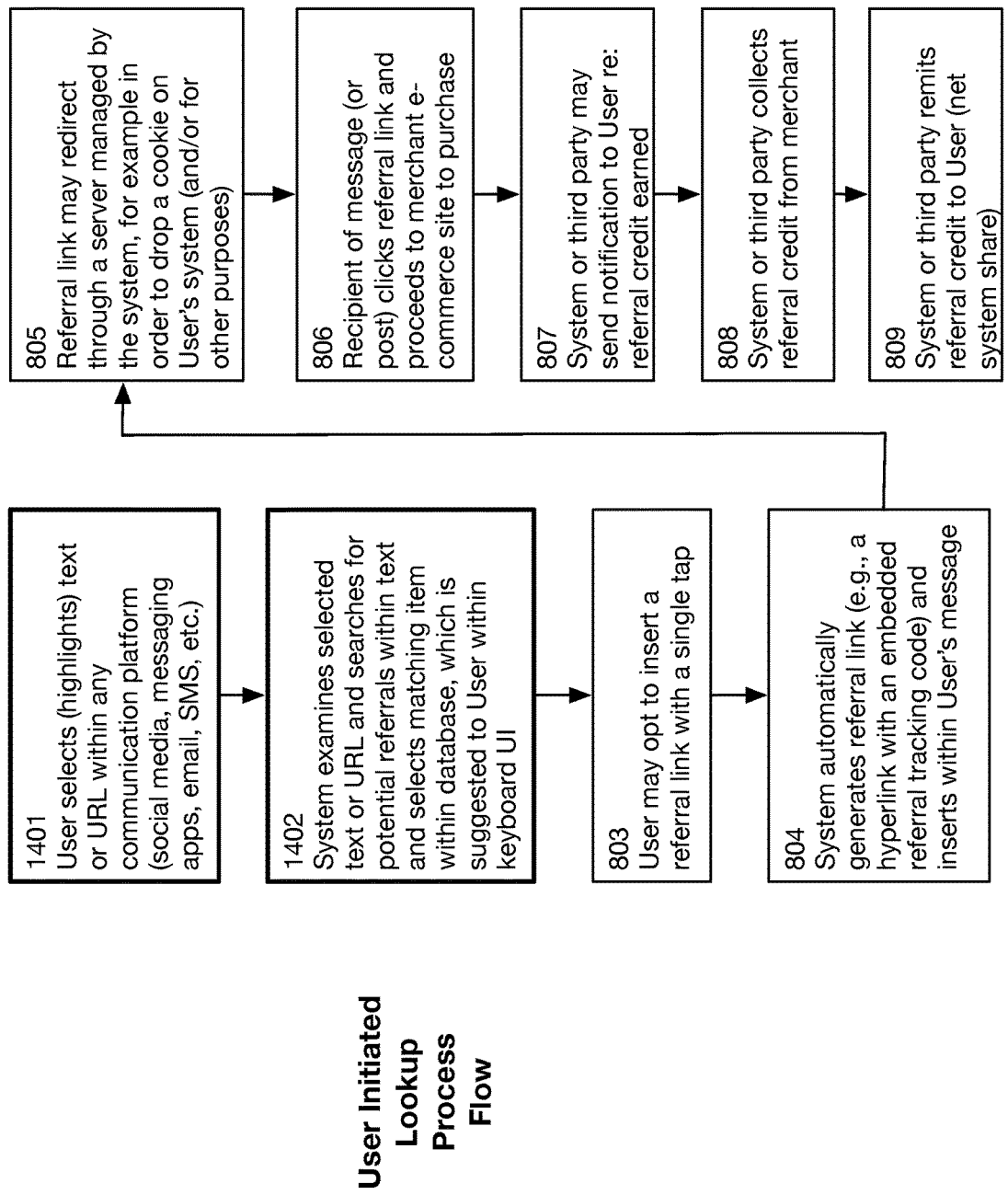
FIG. 14 shows a variation of the process flow of FIG. 8, where a referral is initiated when a user selects text or a URL and searches for matching potential referrals.

FIG. 14 illustrates a variation of the flowchart of FIG. 8, where input is obtained from a user selection instead of from keystrokes of a keyboard as the user types. In step 1401, the user selects text, a URL, or any other item, within any application. In step 1402, the referral matcher analyzes the selected information to identify one or more matching products, services, or merchants in the database; it may then present the match or matches to the user as a suggestion, for example as part of a keyboard app. In another variation, the matcher may work continuously in the background to match the user's input, and may respond with suggestions only when the user requests the matching referrals. The remaining steps in this process flow may be similar to those described with respect to FIG. 8.

For the system features and capabilities described above, one or more embodiments may perform functions that analyze system performance and optimize the system for improved performance over time. For example, optimizations may be performed to improve utilization, utility, or value of the system for users, recipients, merchants, or administrators. Illustrative optimizations may include for example the following processes. The system may use artificial intelligence or other techniques to observe user input content and to identify new items that should be added to the database. The system may aggregate and analyze data regarding user, recipient and merchant use of the system in order to: improve performance of links; increase fees earned; optimize which site or coupon is selected; and maximize conversion rates (such as the fraction of recipient links that are activated or that result in transactions). The system may aggregate and analyze data regarding the frequency of match between content and database items (for example by evaluating ratios such as the number of item matches per word of content or the number of item matches per communication sent); matching algorithms may be adjusted to increase (or decrease) these frequencies. The system may test links (periodically or continuously) to ensure that the URL formatting rules are functioning as intended, and in the event of a malfunction may alert an administrator or fix the malfunction automatically. The system may also incorporate trust and safety procedures and subsystems to monitor, flag, and prohibit fraudulent use of the system, in order to protect the interests of merchants, users, recipients, and administrators.

In one or more embodiments, any combination of the functions performed by the system may utilize technology, software, resources, and services of third-party service providers.

In one or more embodiments, a referral link may be inserted by a communication intermediary that conveys, transmits, routes, directs, receives, stores, forwards, resends, transforms, analyzes, combines, filters, translates, formats, edits, posts, displays, or otherwise handles a message or other communication from a sender to a receiver. The communication intermediary may be any link, service, provider, application, server, or gateway that handles the message or any part of the message at any point in the path from the sender to the receiver. The intermediary may be for example a message gateway associated with the sender, or a message gateway associated with the receiver, or a message gateway associated with both. In some applications, the sending user may not need to take any action for the referral link to be added to a message. The communication intermediary may be responsible for analyzing the message and adding a referral link if appropriate, and the intermediary may in some situations receive credit for a completed referral, either instead of or in addition to the sending user. In some scenarios, no software, app, or utility need be installed at all on the sending user's device or the receiving user's device, and analysis of the message and adding of a referral link may all occur after the communication has left the sender's device and before the communication is delivered to the recipient's device. This approach may simplify management of the referral process, since referral matching and referral tracking may be done centrally at one or a few communications intermediaries, rather than on thousands or millions of user devices. In one or more embodiments, software operating on the sending user's or recipient's device may communicate with the intermediary to select and add a referral link; the sender and recipient may or may not be involved in this process.

FIG. 15 shows an illustrative embodiment that integrates referral matching into the message flow through one or more communications intermediaries. In this example, user 101 constructs a communication 1500, which in this case is a text message, using mobile device 102. In this example, mobile device 102 has no software or application installed that intercepts characters or text of message 1500; instead the user constructs the entire message 1500 and sends it over normal communications channels. Communications carrier 1501 receives the communication 1500 from the device 102. Carrier 1501 may be any type of channel, organization, or infrastructure that conveys, transmits, receives, routes, forwards, stores, directs, edits, filters, formats, or manages any type or types of communications. For example, without limitation, carrier 1501 may be a network provider, a wireless provider, a cellular provider, an internet service provider, a social media platform, a messaging service, a telephone service provider, a broadband service provider, a Wi-Fi provider, an email service, a text message service, a mobile application, a software application, a chat service, an application that conveys, routes, or formats communications, or a gateway between any types of devices, networks, routers, or nodes. Message 1502 may be any type or types of communication, including for example, without limitation, a text message, an email message, a voice message, a video message, a website link, a link to a mobile application, a picture message, a transcribed message, a communication via social media, a communication via a shopping site, a communication via a message board, a posting to a product review service, an encrypted message, a digital communication, a comment posted to a digital media service, and a communication via any messaging application. Carrier 1501 transmits the message 1502 to a gateway 1510, which may for example process the message before forwarding it to the message receiver. The message 1502 may contain an identifier 1503 of the sender, an identifier 1504 of the receiver, and the message body 1505. The sender identifier and receiver identifier may be for example, without limitation, phone numbers, email addresses, social media identities, device IDs or any other identifying information. Messages may contain any other metadata, such as timestamps, priorities, or formats. The communication body 1505 may contain any type or types of content, including for example, without limitation, text, image, voice, audio, video, code, software, links, URLs, website addresses, and attachments.

In the illustrative embodiment of FIG. 15, gateway 1510 transmits the body 1505 of the message to referral matcher 1511. The referral matcher 1511 may execute on a computer that is coupled to or that hosts the gateway 1510. The gateway and the referral matcher may execute on the same computer device, or on different computer devices connected by a network or any other type of link. In one or more embodiments the referral matcher may execute on a computer that is coupled to both the gateway and the sender's device, or to both the gateway and the receiver's device; the gateway, referral matcher, and sender and receiver devices may interact in any manner to identify referral links and transform messages. The communications intermediary that processes messages to identify and insert referrals may be any combination of services executing on any combination of systems, including for example the sending and receiving devices and any intermediate nodes in a communication path between the sender and receiver. A computer that executes the referral matcher, the gateway, or both, may be any processing device or devices, including for example, without limitation, a desktop computer, a laptop computer, a notebook computer, a server, an embedded processor, a GPU, a tablet, a phone, a wearable processing device, a network switch or router, or a network of any of these devices. In this embodiment, only the message body 1505 is transmitted to the referral matcher 1511. The sender identifier 1503 and the receiver identifier 1504 are not transmitted to the referral matcher 1511. This limited information flow to the referral matcher protects the privacy and security of the sender and receiver. Personally identifying information or sensitive personal information of the sender and receiver may be protected in that this information is not transmitted to or accessible by the referral matcher. In one or more embodiments the gateway 1510 or the carrier 1501 may filter out other information as desired before transmitting the message body 1505 to the referral matcher. For example, the gateway 1510 may filter out person names (such as "Jan" and "Cindy"), information such as bank account numbers or social security numbers, or any other data that may be viewed as personal or sensitive.

Referral matcher 1511 then analyzes the message body 1505 to determine whether any words, phrases, text strings, or other content of the body match any of the listings in database 111. This process may for example be similar to the matching processes described above. The referral matcher may for example perform language processing of the message body to compare the content of the message body to the database listings. This language processing may for example use any techniques of natural language processing, machine learning, artificial intelligence, or pattern recognition. Words may be stemmed to simplify comparison to the entries in database 111. If the referral matcher finds a match in search 1512, it may then insert a link 1513 to a site or resource associated with the database entry. This process may be similar to the link insertion described above. However, in the embodiment shown in FIG. 15, the referrer in the link may be for example the carrier 1501 or any other message intermediary or gateway, instead of the sender 1503. The link may be for example a hyperlink 1513 that surrounds the word or phrase in the message body that matches a listing in the database, or any other format such as for example an icon or image adjacent to the matching content. The hyperlink 1513 may link to a site or other resource associated with the merchant, product, service, or other item in the database that matches the message body. For example, without limitation, the link 1513 may be to one or more of a website, a software application, an e-commerce service, a merchant shopping cart, a mobile application, a computer application, a store, a redirector, a link-tracking service, an affiliate network, a video player, a coupon or coupon code, a promotion or promotion code, a discount code, a transaction code, a mapping service, and a URL. In one or more embodiments the link may be to an intermediate server that redirects to the final destination, as described above. The hyperlink 1513 may have an embedded referral code 1514 that identifies one or more referring entities, such as the carrier 1501 or the gateway 1510.

The referral matcher 1511 inserts link 1513 into the message body, and returns the transformed message body 1506 with the link to the gateway 1510. The gateway 1510 may then add the sender and receiver identifiers, and any other metadata, to the transformed message body 1506, resulting and forward the transformed message 1515 to the receiver or receivers. The message may pass through other intermediaries such as carrier 1521, which may be the same as or different from the intermediary 1501 that originally carried the message from the sender's device. The receiver 121 then views the message 123 with link 124 on device 122, as described above.

The matching process 1512 of the referral matcher 1511 may not identify a match between a message body and the database 111. In this situation the referral matcher may return a no-match result 1513 to the gateway, which indicates that the gateway should forward the original message to the receiver.

Figure 15A:
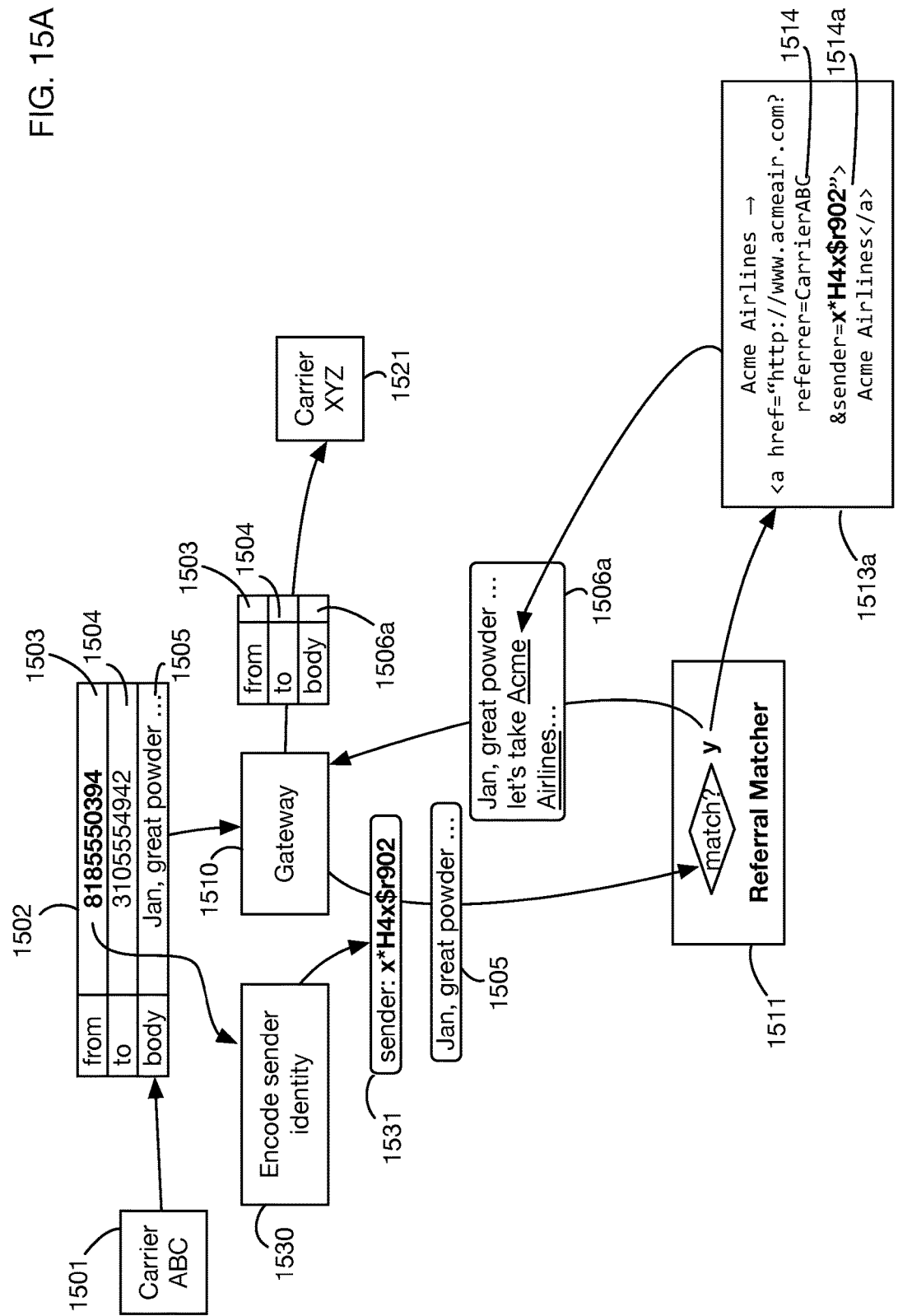
FIG. 15A shows a variation of the embodiment of FIG. 15, where both the sender and the intermediary are identified as referrers.

In one or more embodiments, a referral link may include both the identity of a communication intermediary and an identity of the sender. This situation is illustrated in FIG. 15A. As in FIG. 15, message 1502 is transmitted to gateway 1510, which forwards message body 1505 to referral matcher 1512. In this embodiment, the sender identifier 1503 is encoded in process 1530, and an encoded sender identity 1531 is also passed to the referral matcher. The referral matcher 1511 then inserts an embedded referral tracking code 1514 for the carrier (or other intermediary) and another referral tracking code 1514a with the encoded sender identity. Because the sender identity is encoded, the privacy and personal information of the sender is preserved; however, the sender may be credited for the referral using the encoded identifier. One or more embodiments may put any desired information into one or more embedded referral tracking codes that are integrated into a referral link; this information may identify either directly or anonymously via encoded data any party involved in the creation or transmission of a communication.

In one or more embodiments, a communications intermediary that processes a message may be associated with the receiver of a message rather than, or in addition to, the sender. This scenario is illustrated in FIG. 15B, which is a variation on the embodiment shown in FIG. 15A. Message 1500 is transmitted through two communications intermediaries: first through carrier 1501 that is associated with the sender, and then through carrier 1521 that is associated with the receiver. Other communications intermediaries may exist between carriers 1501 and 1521. Messaging gateway 1510 is linked to carrier 1501; however, unlike the scenario in FIG. 15, this gateway 1510 does not transform the message to insert a referral link. Instead the message is forwarded to carrier 1521 and a second message gateway 1510b that is associated with the receiver's carrier 1521. The receiver gateway 1510b forwards the body 1505 of the message to the referral matcher, which inserts the referral link and returns the transformed message body 1506b to the gateway 1510b. The transformed message 1515b is then sent to the receiver's device 122. In this scenario, the referral link 124b may be associated with the receiving gateway 1510b or the receiving communications carrier 1521, for example.

In one or more embodiments, the referral link may contain the identity of the receiver, instead of or in addition to the identity of the communications intermediary associated with the receiver, or in addition to identities of any other intermediaries or of the sender. This receiver identity may be encoded, similarly to the encoding of the sender identity illustrated in FIG. 15A. In the example shown in FIG. 15B, the transformed link 124b in message body 1506b may for example contain the identity 1514b of the communications intermediary 1521, and the encoded identity 1516b of the receiver 121 or of the receiving device 1222. Referral links may in general contain identities (unencoded or encoded) of any of the parties or systems involved in a communication, including the sender, receiver, carriers, gateways, and other systems involved in message transmission, storage, transformation, or delivery.

Figure 15C:
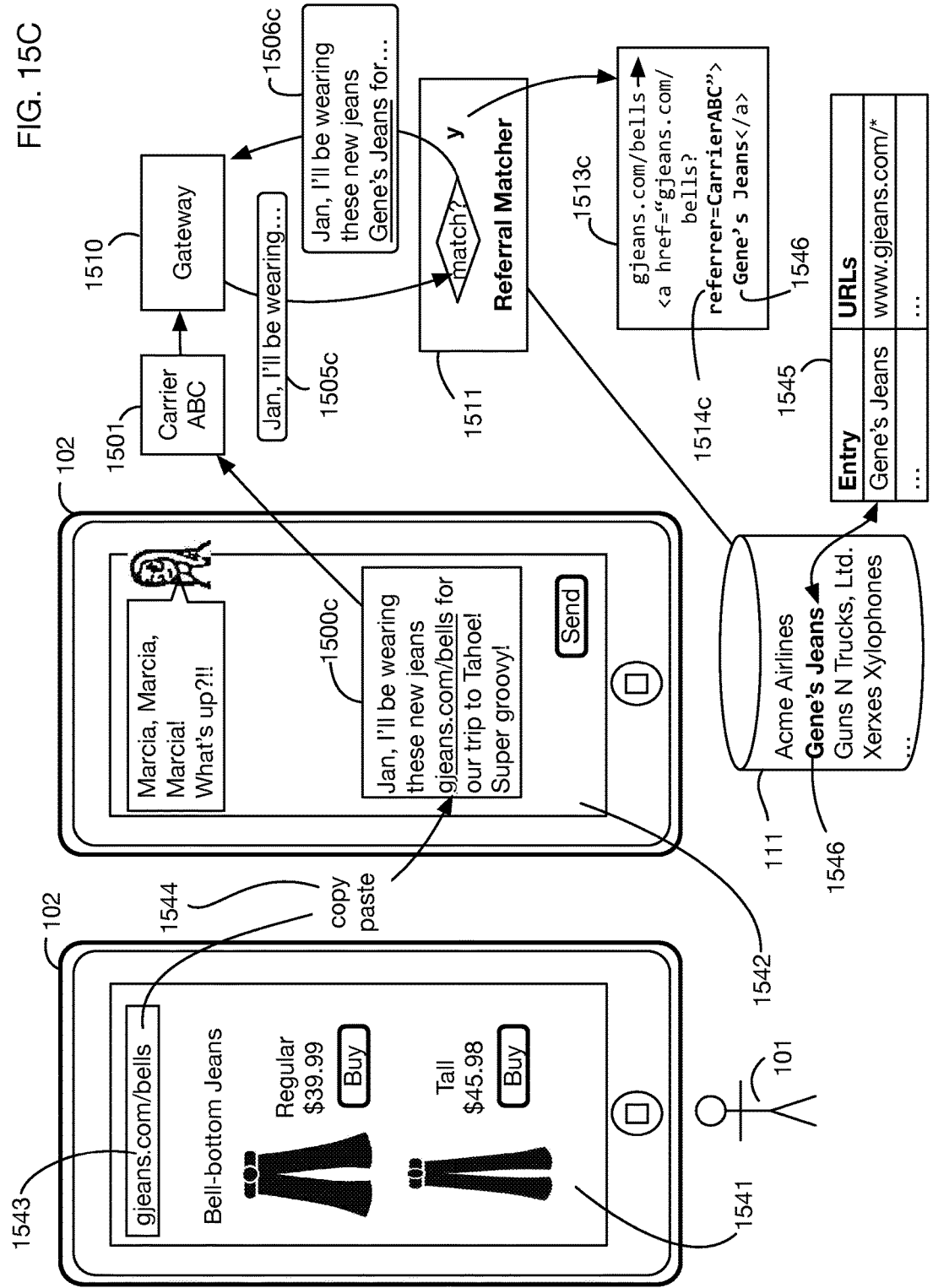
FIG. 15C shows another variation of the embodiment of FIG. 15, where a sender copies a URL into a message, and the referral matcher identifies an entry in the referral database that matches this URL.

Instead of or in addition to generating a link based on references to database entries found in messages, one or more embodiments may transform messages in the opposite sense, and may recognize database entries based on links a user has placed messages. FIG. 15C shows an illustrative example of this process. User 101 initially views screen 1541 on mobile device 102, which may be for example a web browser screen. The user views a web page or similar resource with URL or other identifier 1543, and decides to send this link to one or more recipients in a message. User 101 therefore performs a copy and paste 1544 and inserts the link into message 1500c in screen 1542, which may be for example a messaging app. The message is sent via carrier 1501 and gateway 1510, as described with respect to FIG. 15, and the message content 1505c is transmitted to the referral matcher 1511. In this embodiment, database 111 includes or references a table or other data structure 1545 that associates URLs or similar links with database entries. The referral matcher therefore identifies that the URL 1543 in message body 1505c corresponds to entry 1546. As a result of this match, it makes the transformation 1513c to convert the reference to a hyperlink that identifies the entry 1546 and credits the communications intermediary with an embedded referral code 1514c. One or more embodiments may in addition or instead insert an embedded referral code that references the sender, receiver, or any other entity.

Figure 15D:
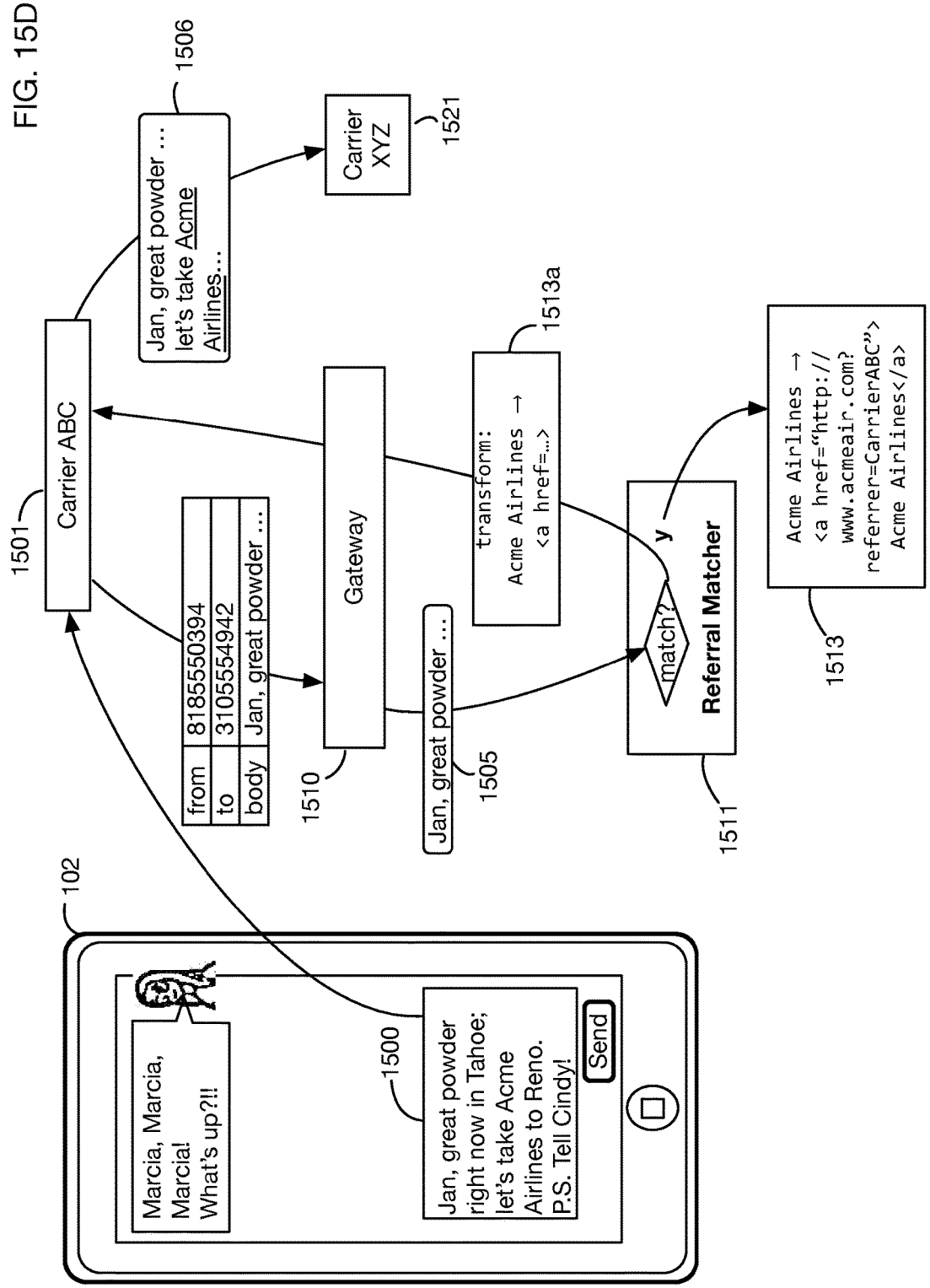
FIG. 15D shows another variation of the embodiment of FIG. 15, where the referral matcher generates transformation instructions that are executed by the communications intermediary to modify a message to insert a referral link.

In one or more embodiments, the transformed communication may include or may consist of instructions for modifications to the message that may be executed at a later stage in the path of the message to the receiver. FIG. 15D shows an illustrative embodiment with a variation on the process flow of FIG. 15, where the initial message transformation generates transformation instructions to add a link to the message, and the message body is modified afterwards based on those transformation instructions. As in FIG. 15, message 1500 is transmitted to communications intermediary 1501, which forwards it to gateway 1510. The body 1505 of the message is processed by referral matcher 1511, which finds a match and determines that a replacement 1513 of a term by a link is indicated. However, the referral matcher in this embodiment does not make the replacement directly; instead it returns transformation instructions 1513a to the gateway 1510. The gateway sends these instructions 1513a to the communications intermediary 1501, which executes the transformation instructions to generate the transformed message 1506. In one or more embodiments, the replacement or augmentation of a portion of a message with a link may be performed at any stage in the transmission of the message from the sender to the receiver; the referral matcher may execute this replacement or augmentation, or it may provide instructions that any later stage or stages may perform to effect the replacement or augmentation of the message.

Figure 16:
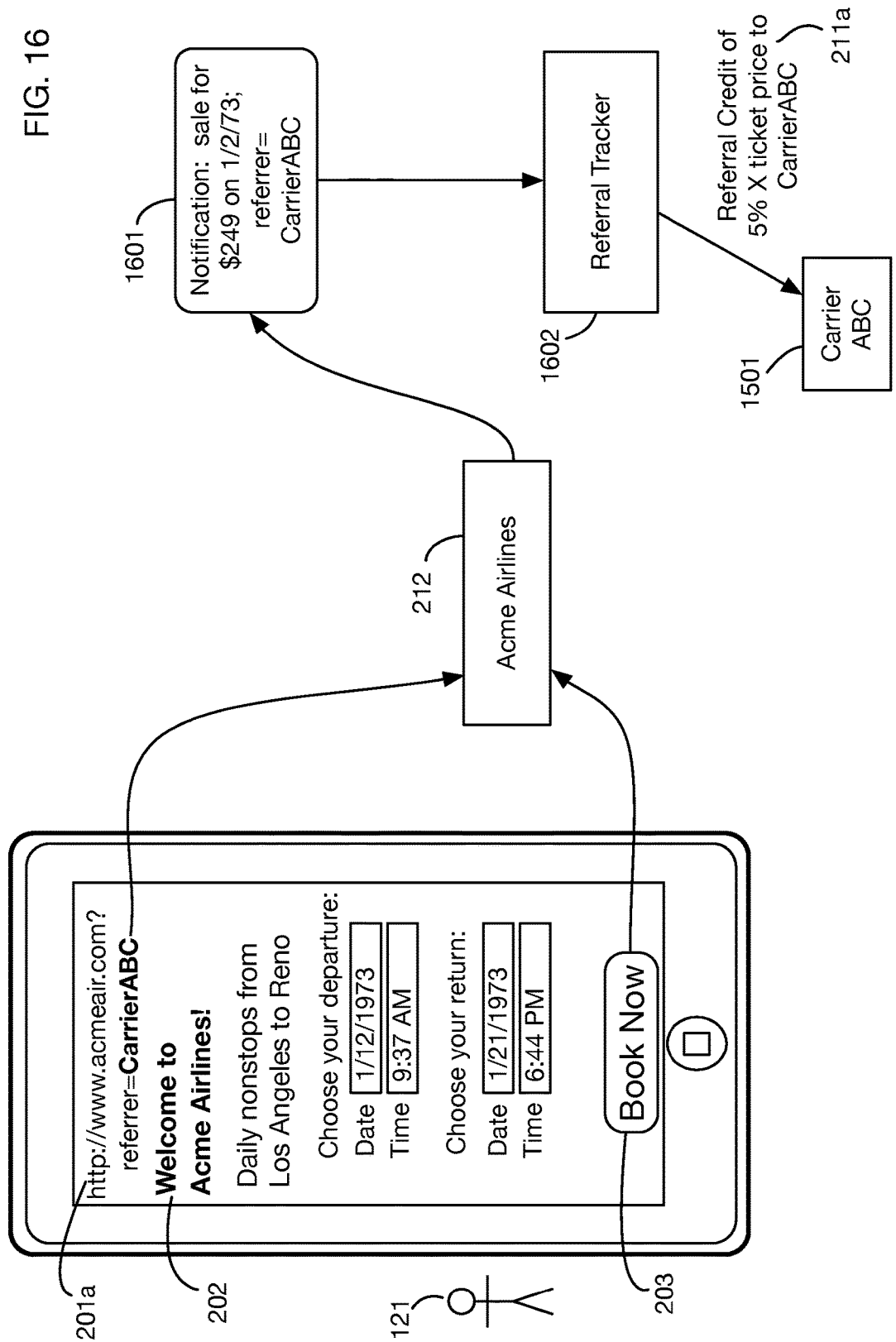
FIG. 16 continues the example of FIG. 15 to illustrate crediting the referring communication intermediary when the recipient clicks the link and makes a purchase.

FIG. 16 continues the example of FIG. 15 to show the referral link being used by a receiver of a communication. If receiver 121 clicks on the link 124, the link directs to site 201a, with an embedded referral tracking code in the URL. If the receiver then performs an action such as a purchase by pressing the button 203, the merchant 212 may transmit a notification 1601 of the transaction to referral tracker 1602. The referral tracker 1602 may be integrated with the referral matcher, or it may be a separate system. The notification 1601 may include the referral tracking code, so that the referral tracker can calculate a credit 211a and record or transmit this credit to the appropriate entity 1501, which in this example is the carrier. For the scenario illustrated in FIG. 15A, credits may be provided to both a communication intermediary and to the sender of the message. For the scenario illustrated in FIG. 15B, credits may be provided to both the communications intermediary associated with the receiver, and to the receiver of the message.

Figure 17:
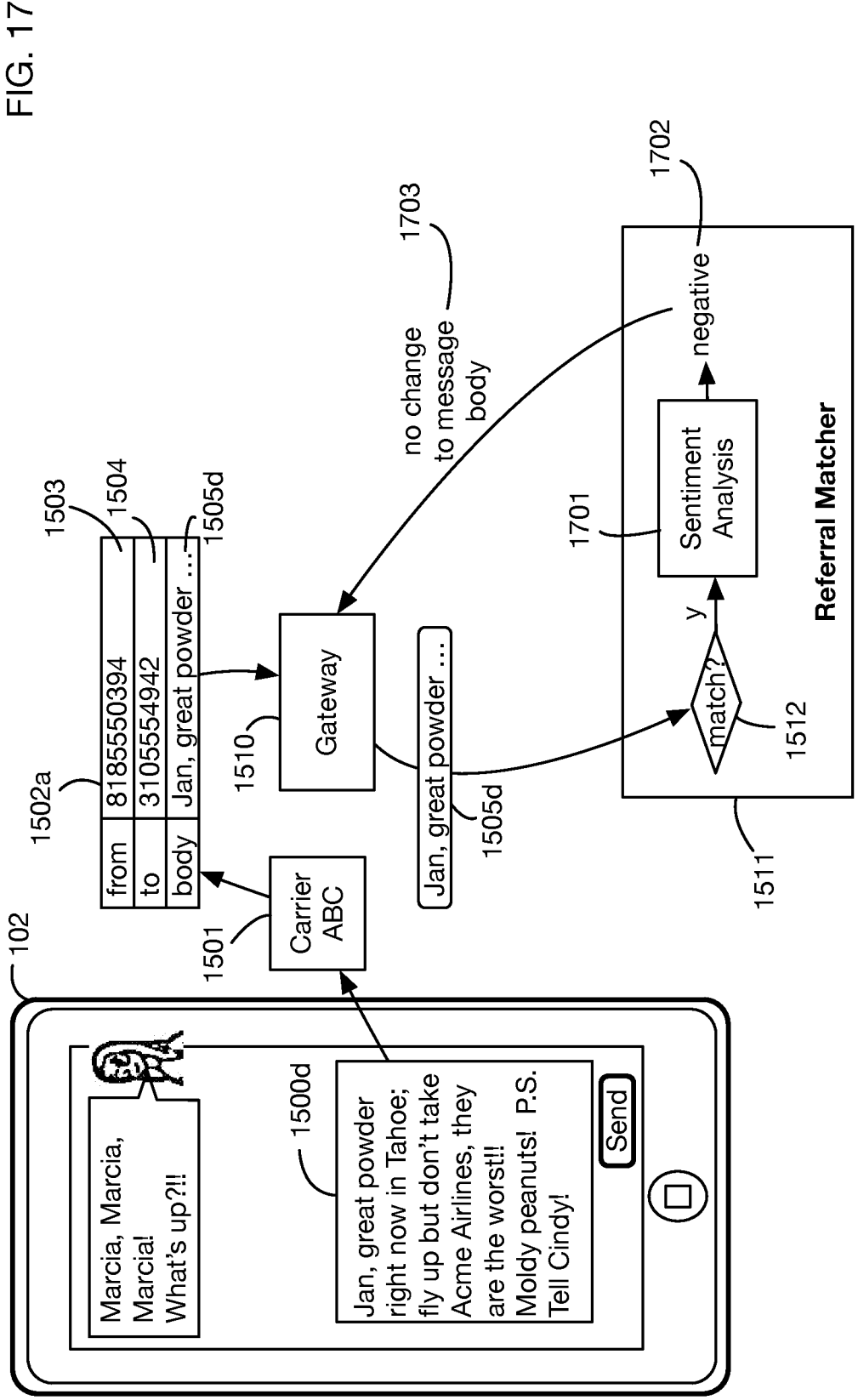
FIG. 17 shows an illustrative embodiment that performs sentiment analysis on a message to avoid adding a link to a target that the message refers to negatively.

In one or more embodiments, the referral matcher 1511 may perform additional analysis of the body of a communication to determine whether the context of the match indicates that adding a referral link is warranted. FIG. 17 shows an example where message 1500d mentions a merchant, but in a negative sense. The referral matcher 1511 may first perform matching search 1512 on message body 1505d to determine that the merchant is mentioned or otherwise matches the communication body, and then perform sentiment analysis 1701 to determine whether the mention is positive, neutral, or negative for example. Sentiment analysis 1701 may use any of the techniques known in the art to determine the sentiment associated with a message. For example, sentiment analysis 1701 may track the usage of positive or negative words, particularly if they are in proximity to the located matching work or phrase. In this example, sentiment analysis determines that the sentiment 1702 is negative; therefore, the referral matcher returns an indication 1703 to the gateway that it has not added a referral link.

Figure 17A:
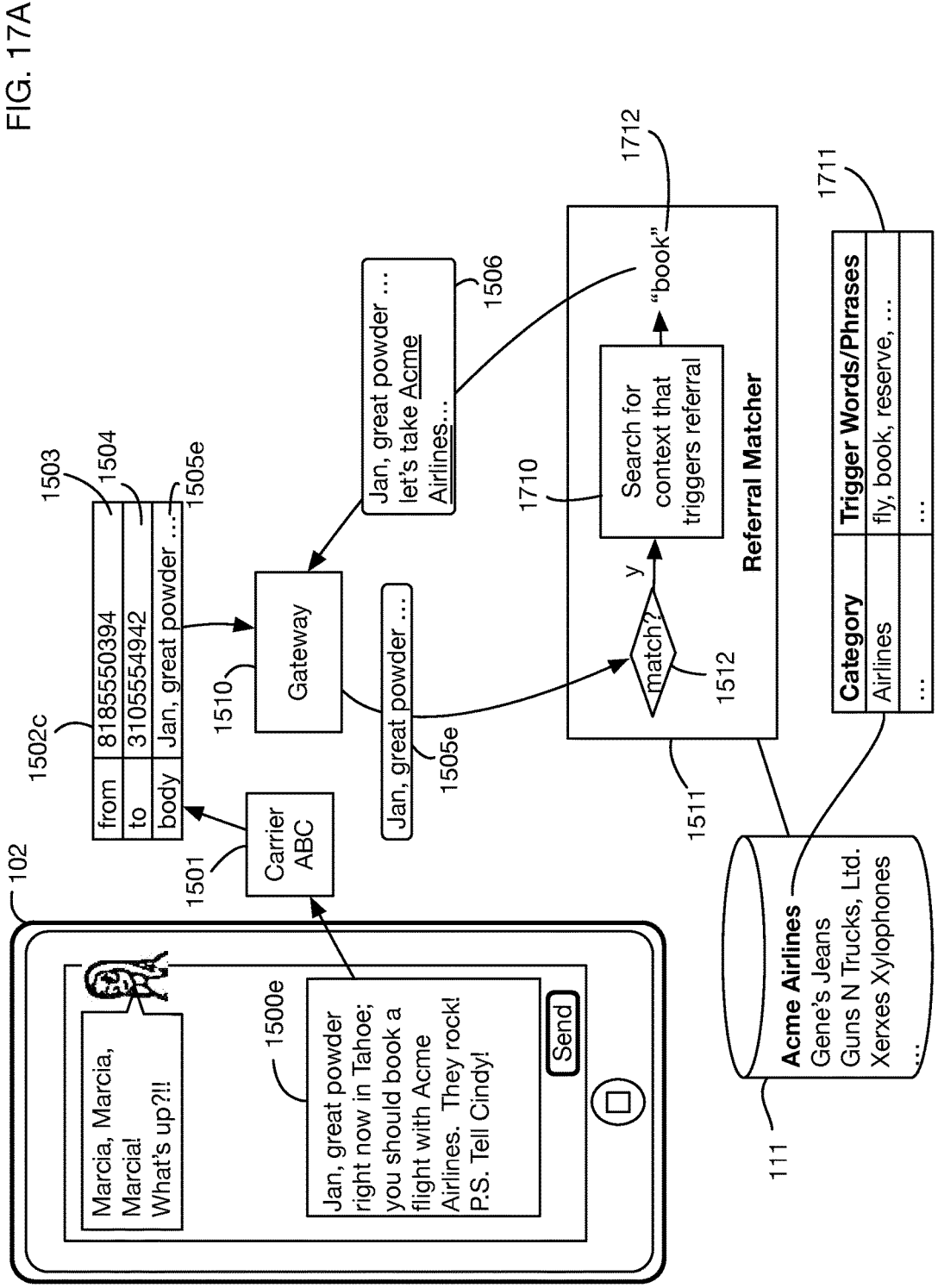
FIG. 17A shows an illustrative embodiment that analyzes the context of a matching item, such as nearby words or phrases, to determine whether to a referral link.

In one or more embodiments, the referral matcher may analyze the body of a communication to determine whether a database entry is referenced in or with a context that indicates that a referral link is appropriate. The required context may for example include certain trigger words or trigger phrases that must appear in proximity to the mention of the item in order to generate a referral link. This situation is illustrated in FIG. 17A. Referral database 111 contains or references a set of trigger words or phrases 1711 associated with entries in the database or with categories of entries. Message 1500e is sent from device 102, and corresponding message body is transmitted to referral matcher 1511. The matching step 1512 indicates that an item from database 111 occurs in the message body. The subsequent step 1710 searches the message body 1505e for additional context that may be required to generate a referral. For the matched item, the trigger word 1712 from table 1711 appears in the message body 1505e in a position that is near the matched item; therefore, the referral link is inserted into transformed message body 1506. If no trigger word or phrase were located, then the existence of the positive match from the initial matching step 1512 may not be sufficient to generate a referral link in this illustrative example.

In one or more embodiments, the closeness of a match needed between the text of a communication body and a listing in the database may be a configurable parameter that may be set for example by the gateway or by a communication intermediary. FIG. 18 shows an illustrative embodiment with three levels of "closeness of match" defined. These levels are illustrated in table 1805 for entry 1810 of database 111. The most specific type of match is "exact," which requires that specific words or phrases describing the particular merchant, brand, or similar item be present in the body of a communication. The next, less specific type of match is "category," which is a grouping of a generic class of products or services into which the associated listing belongs. The least specific type of match is "activity," which describes activities for which the associated listing is related. These groupings are illustrative; one or more embodiments may use any type of hierarchy or other organization of matching levels. The gateway 1510 (or other entity) may set a closeness-of-match parameter 1801 from among these three levels to control how the referral matcher 1511 operates. In the example of FIG. 18, if parameter 1801 is value 1803a (exact), then the matcher indicates no match 1804a, since the words associated with exact match do not appear in the message; however if parameter 1801 is either 1803b (category) or 1803c (activity), then the referral matcher does find a positive match. For message 1500f with message body 1505f, the referral matcher may for example insert a referral link to listing 1810 around the category word "flight" in transformed message body 1506f.

Figure 18A:
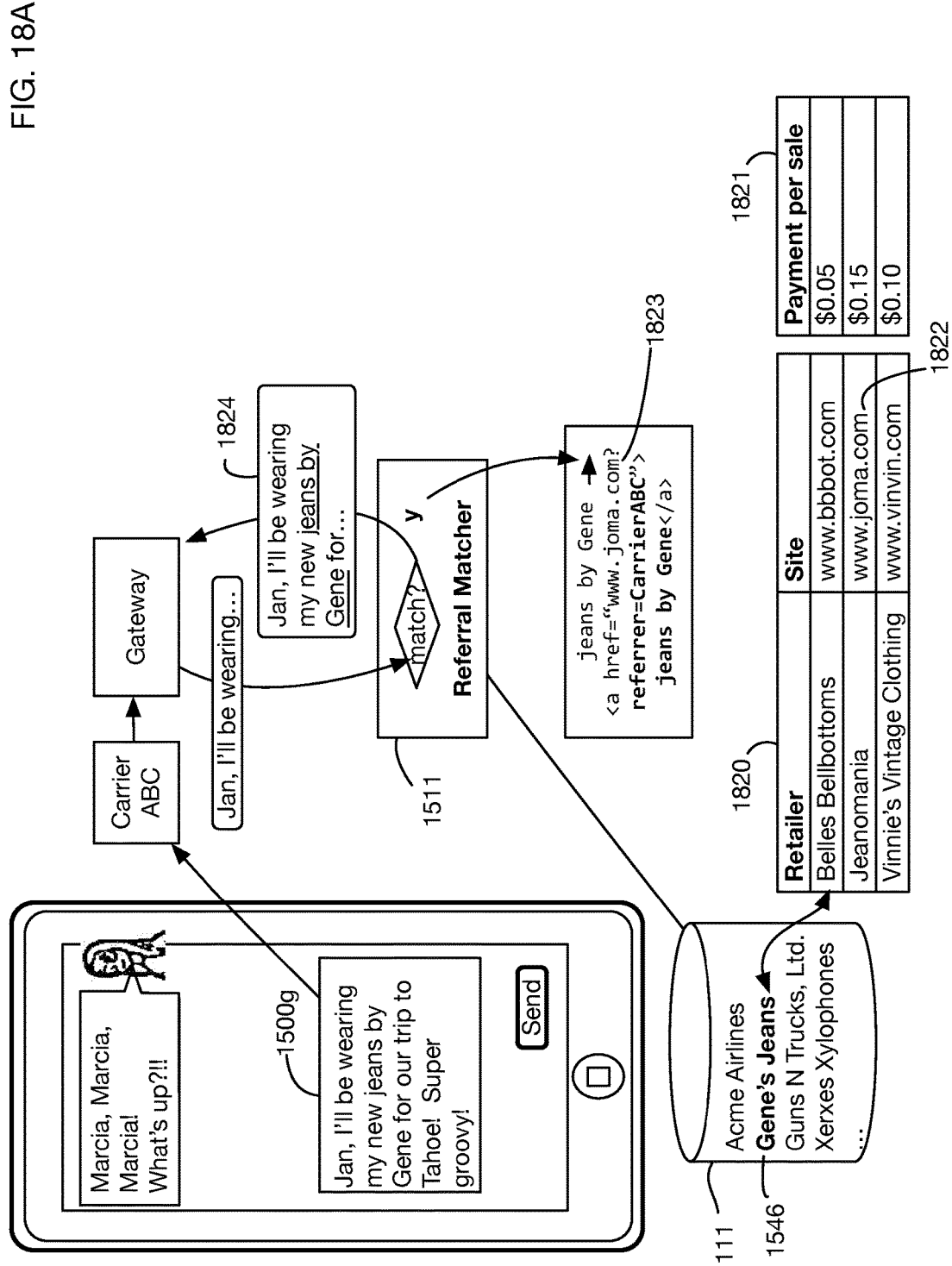
FIG. 18A shows an illustrative embodiment with multiple sites that match a database listing; the referral matcher selects a specific site from the multiple options based on performance metrics such as the reimbursement for a successful referral.

Particularly for non-exact matches, a referral matcher may in some scenarios identify multiple listings in database 111 that match a communication body, even for the same word or phrase. In these situations, the referral matcher may select from among the multiple matches, using for example prioritization processes as described above based on factors such as conversion rates, payout rates, or seller reliability. In some situations, a listing in database 111 may be associated with multiple sites, and generation of a referral link may include selection of a specific site from these multiple sites. FIG. 18A shows an illustrative embodiment with listing 1546 in database 111 associated with multiple sites 1820. In this example, listing 1546 is a brand, and the sites 1820 associated with the list correspond to retailers that offer this brand for purchase. One or more embodiments may associate multiple sites with a database listing in any desired manner. Referral matcher 1511 may select a specific site from the sites 1820, and may insert a link to that selected site into the transformed communication. This selection may be based on any criterion or criteria, as described above. In the example shown in FIG. 18A, data 1821 associated with each site is available to the referral matcher (either in database 111 or as another data source accessible to the referral matcher). This data shows the amount of referral fee each retailer pays for a completed transaction resulting from a recipient clicking on a referral link and completing a purchase. In this example, the site 1822 with the highest payment per sale is selected and is inserted as link 1823 into transformed message 1824. Any performance metric in addition to or instead of payment data may be used to select a specific site from multiple sites associated with a listing in one or more embodiments. Illustrative performance metrics associated with a site that may be used in one or more embodiments include for example, without limitation, the amount of referral credit provided by the site, the price of items on the site, the closeness of match of the site to the communication, the transaction conversion rate of the site, a defined set of business logic associated with the site, closeness of match of the site to characteristics of the sender or receiver, proximity of the location of the site to the sender location or receiver location, speed of fulfillment by the site, and a review score, popularity score, or rating score associated with the site.

In one or more embodiments, the selection of a specific site from multiple matching sites may be performed after a recipient clicks on a referral link, as described for example above with respect to FIG. 8A. The referral link may send a recipient to an intermediate server, which then accesses data such as a list of possible destination sites 1820 and metrics 1821 associated with each site in order to select a final destination site.

Figure 19:
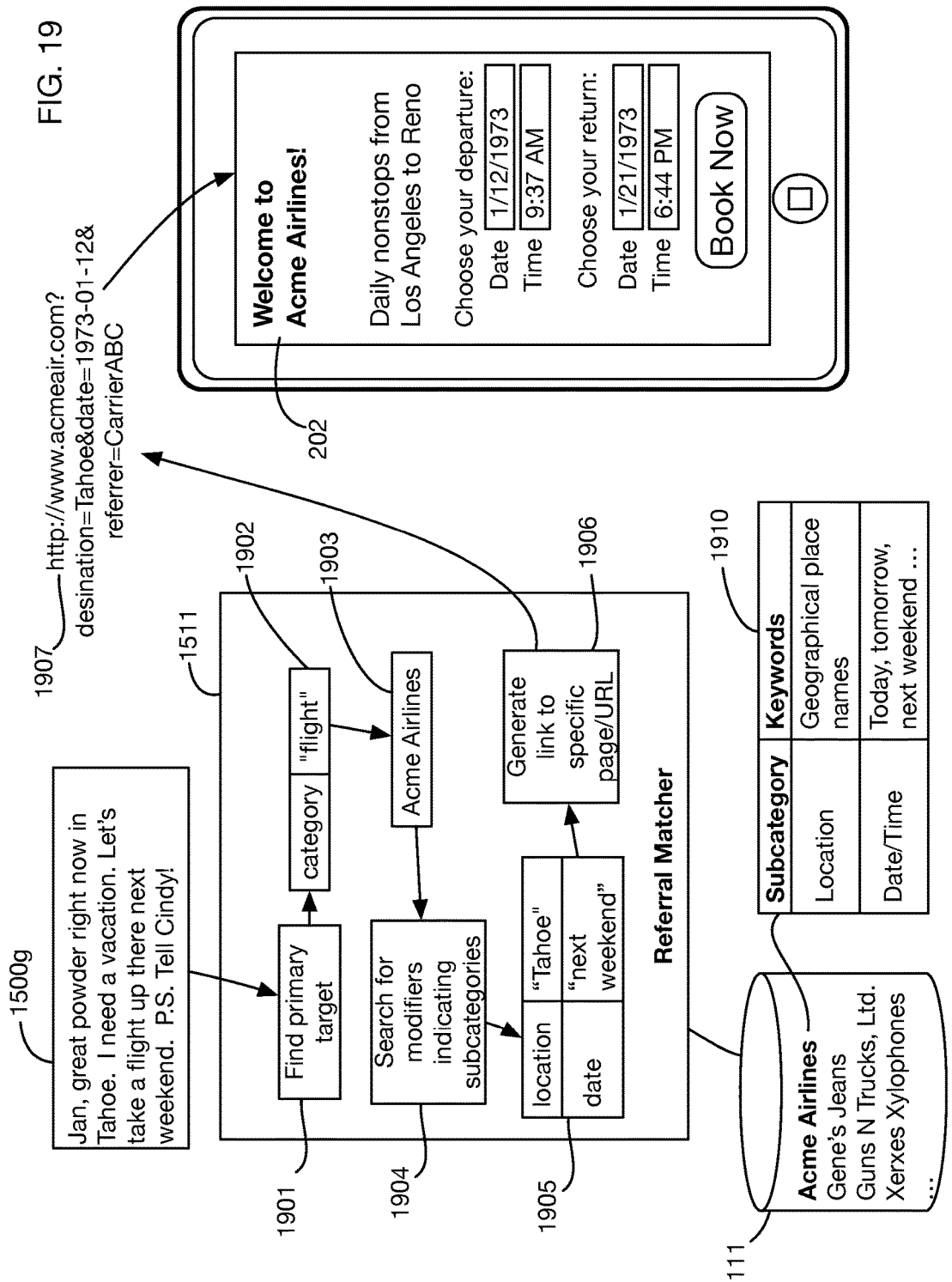
FIG. 19 illustrates an embodiment that searches a message for subcategory information related to a primary target in order to generate a more specific referral link.

In one or more embodiments, language processing or other analysis of the body of a communication may allow the referral matcher to generate a more specific link that incorporates additional information from the communication. FIG. 19 shows an illustrative embodiment in which listings in the database 111 may be associated with subcategory information that may be used to identify a more specific page on a site or specific parameters in a referral link URL. The type of subcategory information that is relevant may in general vary among listings in the database 111. For example, for clothing brands, relevant subcategory information may include data such as size, style, or color; for air travel, on the other hand, relevant subcategory information may include data such as departure, destination, date, and time. In the example shown in FIG. 19, referral matcher 1511 first performs a search 1901 for a primary target match between the body of message 1500g and listings in database 111. The result is a category match 1902 that is associated with listing 1903. Database 111 contains a table 1910 of subcategory information linked to this listing, which indicates that location and date/time information may be relevant to a referral link for this entry. This data is used in a subsequent search 1904 for modifiers in the message body that may indicate the subcategories of flights that are relevant. This search may look for certain keywords or categories of words or phrases, such as those identified in table 1910, or it may use any other type of natural language processing or artificial intelligence to infer modifiers and context. The search results 1905 may be used in link generation process 1906, which generates referral link 1907. This link 1907 passes the location data and date/time data (which the system may convert from the generic "next weekend" to a specific date) to the target site as URL parameters. One or more embodiments may use subcategory data to refine a referral link in any desired manner, including for example linking to a specific page on a site, linking to one of several related sites, or passing data to a web page in URL parameters.

One or more embodiments may analyze message histories in addition to individual messages to generate referral links. For example, the content of message 1500g of FIG. 19 may be spread over two or more messages, and the system may analyze the combined content of these messages to determine whether a referral link should be added and possibly to determine the specific target of the link. For instance, a first message may contain the first sentence of message 1500g, which indicates the destination. A subsequent message may contain the remainder of message 1500g, which indicates the date. The system may track the message history to generate the specific referral link 1907, which combines the location data from a previous message with the date information from a subsequent message.

Figure 20:
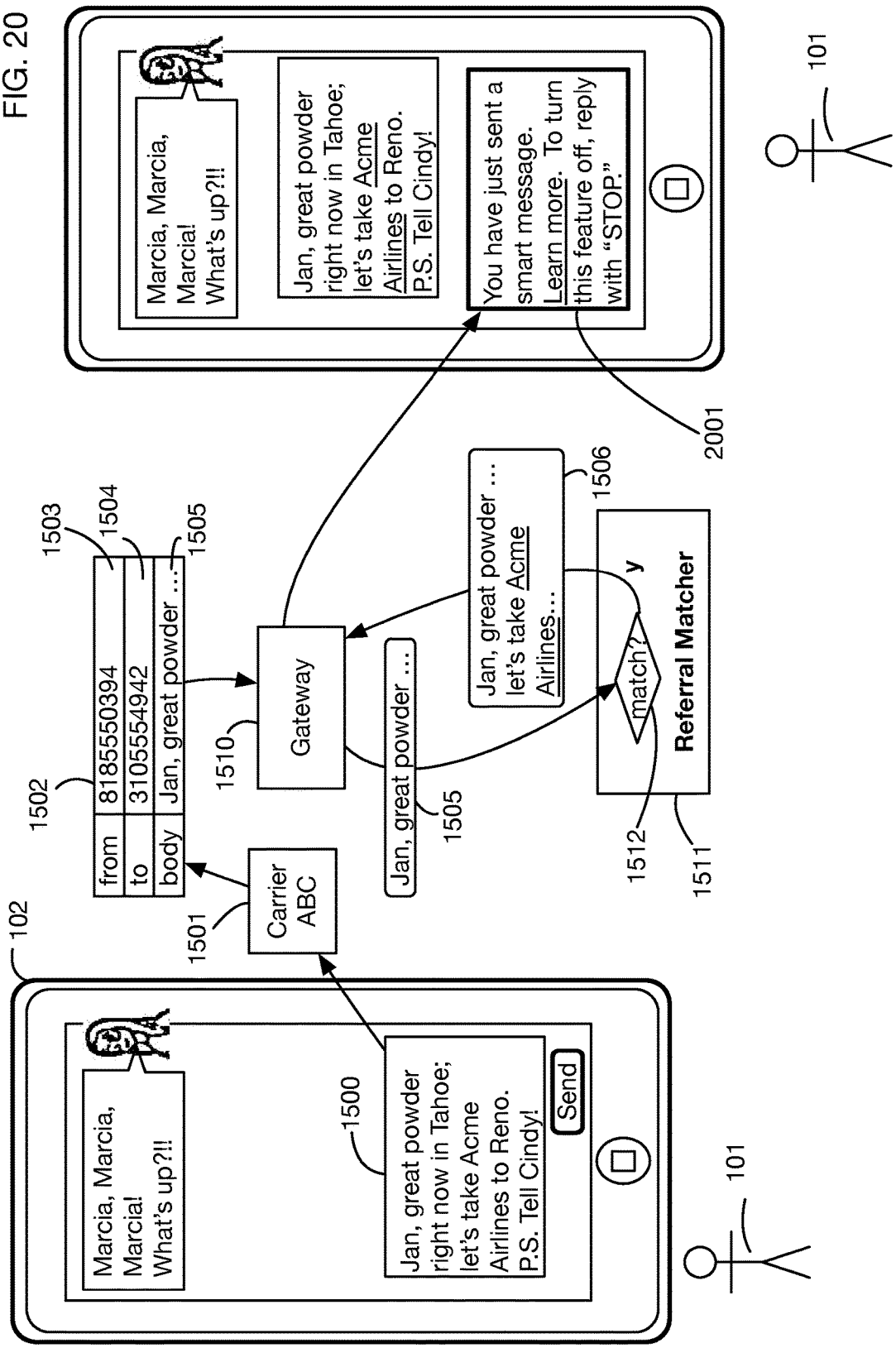
FIG. 20 shows an illustrative embodiment that lets a sender opt-out of having referral links added by a communication intermediary.

In one or more embodiments, senders or receivers of messages may be able to opt-out of the link insertion process performed by a communication intermediary or gateway. This feature is illustrated in FIG. 20, which illustrates a variation on the example of FIG. 15. In this example, the gateway 1510 passes the message body 1505 to referral matcher 1511 and receives a transformed body 1506 with an inserted referral link. The gateway (or the carrier 1501) recognizes that this message is the first message from the sender 101 for which a referral link has been generated. Therefore, it generates a message 2001 to the sender that informs the sender that the sender's message has been automatically converted to a "smart message" with an embedded link. The sender has the option of learning more about the process, and of opting out of having links added to messages from this sender. If the sender chooses to opt out, the gateway 1510 or the carrier 1501 may track this information and may refrain from sending future messages from this sender to the referral matcher 1511. One or more embodiments may provide a similar opt-out capability for the receiver. One or more embodiments may instead require the sender or receiver to opt in to the referral link process before generating these links. In addition to or instead of opting in or opting out, in one or more embodiments the sender or receiver may be able to send any other types of communication preferences messages to the referral matcher or to any of the communications intermediaries. Communications preferences messages may for example modify the frequency with which referral links are inserted, or the manner in which the referral links are inserted, displayed, or used. For example, a recipient may request that referral links be inserted only from selected senders, only for selected topics, or only at specific times. A recipient may request that referral links be highlighted in messages as referral links, to distinguish them from other links that may already be in messages, or that referral links be displayed only at certain times or under certain conditions. A sender may similarly request for example that referral links be inserted only for selected recipients, only at a certain frequency, or only for certain topics.

While the invention herein disclosed has been described by means of specific embodiments and applications thereof, numerous modifications and variations could be made thereto by those skilled in the art without departing from the scope of the invention set forth in the claims.

What is claimed is:

1. A messaging gateway monetization system comprising:
    a database comprising one or more listings, each listing of said one or more listings comprising one or more of a product, a service, a brand, a merchant, a name of a merchant, a name of a web site, a name of a product, a name of a service, a location, a review, a rating, a product number, a model number, a description, a picture, an image, a diagram, a barcode, a UPC number, an RF code, an activity, a keyword, a phrase, a product category, an SKU, an instruction, a suggestion, a solution, an information source, a person, an organization, a professional;
    a computer coupled to said database and coupled to a communication intermediary in a communication path between a first user and a second user, wherein
    said computer receives a communication between said first user and said second user;
    said communication comprises one or more of
        an identifier of said first user,
        an identifier of said second user,
        a communication body;
    said computer is configured to execute specific instructions to implement a referral matcher that is configured to
        process said communication to determine whether a positive match exists between said communication and at least one of said one or more listings;
        when said positive match exists, generate a referral link that comprises
a link to a site associated with said at least one of said one or more listings; and
an embedded referral tracking code that identifies a referrer, wherein said referrer comprises one or more of
said first user,
said second user,
said communication intermediary;
transform said communication to a transformed communication containing said referral link; and
transmit said transformed communication to said communication intermediary, wherein said communication intermediary is configured to transmit said transformed communication along said communication path to said second user; and,
implement a referral tracker that is configured to
obtain a notification when said second user uses said referral link and performs an associated task; and,
transmit or record a referral credit to said referrer based on said notification.

2. The system of claim 1, wherein said communication intermediary comprises one or more of
a communications carrier;
a network provider;
an internet service provider;
a social media platform;
a messaging service;
a telephone service provider;
a broadband service provider;
a Wi-Fi provider;
an email service;
a text messaging service;
a mobile application;
a software application;
a chat service;
an application which conveys, transmits, receives, routes, or formats communications;
a gateway coupled to or executing on said computer.

3. The system of claim 1, wherein said communication comprises one or more of a message, a text message, an email message, a voice message, a video message, a website link, a link to a mobile application, a picture message, a transcribed message, a communication via social media, a communication via a shopping site, a communication via a message board, a posting to a product review service, an encrypted message, a digital communication, a comment posted to a digital media service, a communication via a messaging application.

4. The system of claim 1, wherein said uses said referral link comprises performs one or more of a tap, click, gesture, response, user interface interaction, verbal command.

5. The system of claim 1, wherein said associated task comprises one or more of a click, view, visit, transaction, purchase, reservation, subscription, sign-up, submission, software installation, download, inquiry, content consumption, survey completion, participation in a digital interaction.

6. The system of claim 1, wherein said site comprises one or more of a website, a software application, an e-commerce service, a merchant shopping cart, a mobile application, a computer application, a store, a redirector, a link-tracking service, an affiliate network, a video player, a coupon or coupon code, a promotion or promotion code, a discount code, a transaction code, a mapping service, a URL.

7. The system of claim 1, wherein said database further comprises one or more of a file, library, catalog, directory, open graph, real-time web search, cached web search result, data feed.

8. The system of claim 1, wherein said process said communication to determine whether said positive match exists comprises one or more of
determine whether a word, text string or phrase in said communication corresponds to said at least one of said one or more listings;
determine whether an image in said communication corresponds to said at least one of said one or more listings;
determine whether an audio or video component in said communication corresponds to said at least one of said one or more listings;
determine whether a website link, URL, website address or link to a mobile application in said communication corresponds to said at least one of said one or more listings;
determine whether a code in said communication corresponds to said at least one of said one or more listings.

9. The system of claim 1, wherein said process said communication to determine whether said positive match exists further comprises
perform sentiment analysis on said communication to determine a sentiment expressed in said communication towards said at least one of said one or more listings.

10. The system of claim 1, wherein
said computer is further configured to execute specific instructions to receive or access a closeness-of-match parameter; and,
said process said communication to determine whether said positive match exists further comprises
compare said closeness-of-match parameter to how closely said communication corresponds to said at least one of said one or more listings.

11. The system of claim 1, wherein
said process said communication to determine whether said positive match exists further comprises determine whether said communication matches a subcategory within said at least one of said one or more listings;
when said communication matches said subcategory, generate said referral link comprising one or both of
a link to a page in said site that corresponds to said subcategory; and,
a link comprising one or more URL parameters that correspond to said subcategory.

12. The system of claim 11, wherein said subcategory comprises one or more of a size, a style, a model, a type, a sub-brand, a feature, a characteristic, a quality, a name, a stock keeping unit, a color, a date, a time, a location, a quantity.

13. The system of claim 1, wherein one or both of said computer and said communication intermediary are configured to
receive an opt-out message from one or both of said first user and said second user;
when said opt-out message is received, disable said referral matcher for said communication from said first user to said second user.

14. The system of claim 1, wherein one or both of said computer and said communication intermediary are configured to
receive a communication preferences message from one or both of said first user and said second user;

when said communication preferences message is received, modify said referral matcher to adjust one or both of a frequency or a manner with which referral links are added or displayed in messages from said first user to said second user.

15. The system of claim 1, wherein said referral matcher is further configured to select said site associated with said at least one of said one or more listings from said two or more sites when said positive match exists and when two or more sites correspond to said at least one of said one or more listings.

16. The system of claim 15, wherein said select said site associated with said at least one of said one or more listings from said two or more sites comprises compare said two or more sites based upon a performance metric; and, select a best site with a best performance metric as said site associated with said at least one of said one or more listings.

17. The system of claim 16, wherein said performance metric associated with a specific site comprises one or more of an amount of referral credit associated with said specific site;

a price associated with said specific site;

how closely said communication corresponds to said specific site;

a transaction conversion rate associated with said specific site;

a defined set of business logic associated with said specific site;

how closely characteristics of said first user correspond to said specific site;

how closely characteristics of said second user correspond to said specific site;

proximity of a location of said first user to said specific site;

proximity of a location of said second user to said specific site;

a location associated with said specific site;

a speed of fulfillment associated with said specific site;

a review score, a popularity score or a rating score associated with said specific site.

18. The system of claim 1, wherein said site comprises an intermediate server; and, when said recipient accesses said site via said referral link, said intermediate server is configured to identify one or more destinations that match said referral link;

select a specific destination from said one or more destinations;

redirect said recipient to said specific destination.

19. The system of claim 18, wherein said select said specific destination from said one or more destinations that match said referral link comprises compare said one or more destinations on a performance metric; and, select a destination from said one or more destinations with a best performance metric.

20. The system of claim 19, wherein said performance metric associated with a destination comprises one or more of an amount of referral credit associated with said destination;

a price associated with said destination;

how closely said communication corresponds to said destination;

a transaction conversion rate associated with said destination;

a defined set of business logic associated with said destination;

how closely characteristics of said first user correspond to said destination;

how closely characteristics of said second user correspond to said destination;

proximity of a location of said first user to said destination;

proximity of a location of said second user to said destination;

a location associated with said destination;

a speed of fulfillment associated with said destination;

a review score, a popularity score or a rating score associated with said destination.

* * * * *